(12) United States Patent
Homma et al.

(10) Patent No.: US 10,868,923 B2
(45) Date of Patent: Dec. 15, 2020

(54) COMMUNICATION MANAGEMENT SYSTEM, COMMUNICATION SYSTEM, COMMUNICATION CONTROL METHOD, AND RECORDING MEDIUM

(71) Applicants: Takeshi Homma, Kanagawa (JP); Shigeru Nakamura, Kanagawa (JP); Yuichi Kawasaki, Kanagawa (JP); Hiroshi Hinohara, Kanagawa (JP); Kenichiro Morita, Tokyo (JP); Atsushi Miyamoto, Kanagawa (JP)

(72) Inventors: Takeshi Homma, Kanagawa (JP); Shigeru Nakamura, Kanagawa (JP); Yuichi Kawasaki, Kanagawa (JP); Hiroshi Hinohara, Kanagawa (JP); Kenichiro Morita, Tokyo (JP); Atsushi Miyamoto, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 16/699,122

(22) Filed: Nov. 29, 2019

(65) Prior Publication Data
US 2020/0177742 A1   Jun. 4, 2020

(30) Foreign Application Priority Data

Nov. 30, 2018 (JP) ................. 2018-225978
Nov. 20, 2019 (JP) ................. 2019-209746

(51) Int. Cl.
*H04N 9/80* (2006.01)
*H04N 1/00* (2006.01)
(Continued)

(52) U.S. Cl.
CPC ....... *H04N 1/00225* (2013.01); *H04L 67/141* (2013.01); *H04M 3/5307* (2013.01);
(Continued)

(58) Field of Classification Search
CPC ............... H04N 7/147; H04N 1/00307; H04N 1/00209; H04M 3/567; H04L 65/403
(Continued)

(56) References Cited

U.S. PATENT DOCUMENTS

2013/0038676 A1   2/2013   Tanaka et al.
2014/0074932 A1   3/2014   Mihara et al.
(Continued)

FOREIGN PATENT DOCUMENTS

JP   2011-254453   12/2011
JP   2014-056454   3/2014
(Continued)

*Primary Examiner* — Robert Chevalier
(74) *Attorney, Agent, or Firm* — Xsensus LLP

(57) ABSTRACT

A communication management system, a communication system, a communication control method, and a recording medium. The communication management system manages sharing of data between a plurality of communication terminals and transmits storage location information indicating a storage location of image data, the storage location information to be received by a first communication terminal of the plurality of communication terminals, receives a notice indicating a start of uploading of the image data to the storage location indicated by the storage location information, the notice transmitted by the first communication terminal, transmits the notice indicating the start of uploading of the image data, the notice to be received by a second communication terminal of the plurality of communication terminals, receives stroke data for reproducing a stroke image, the stroke data transmitted by the first communication terminal, and transmits the stroke data, the stroked data to be received by the second communication terminal.

10 Claims, 18 Drawing Sheets

(51) Int. Cl.
  *H04N 7/14*    (2006.01)
  *H04L 29/08*   (2006.01)
  *H04N 7/15*    (2006.01)
  *H04M 3/53*    (2006.01)
  *H04N 5/38*    (2006.01)

(52) U.S. Cl.
  CPC .............. *H04N 5/38* (2013.01); *H04N 7/147* (2013.01); *H04N 7/152* (2013.01); *H04N 2201/0094* (2013.01)

(58) Field of Classification Search
  USPC ................................ 386/241, 239, 248, 326
  See application file for complete search history.

(56)          References Cited

U.S. PATENT DOCUMENTS

| | | | |
|---|---|---|---|
| 2016/0006889 A1* | 1/2016 | Kanno | H04N 1/00214 |
| | | | 358/1.15 |
| 2017/0034698 A1 | 2/2017 | Homma et al. | |
| 2017/0264671 A1 | 9/2017 | Homma et al. | |
| 2019/0286255 A1* | 9/2019 | Kawasaki | G06F 3/03545 |

FOREIGN PATENT DOCUMENTS

| | | |
|---|---|---|
| JP | 2014-110559 | 6/2014 |
| JP | 2015-070345 | 4/2015 |
| JP | 2015-070543 | 4/2015 |
| JP | 2017-027561 | 2/2017 |
| JP | 2017-163471 | 9/2017 |

\* cited by examiner

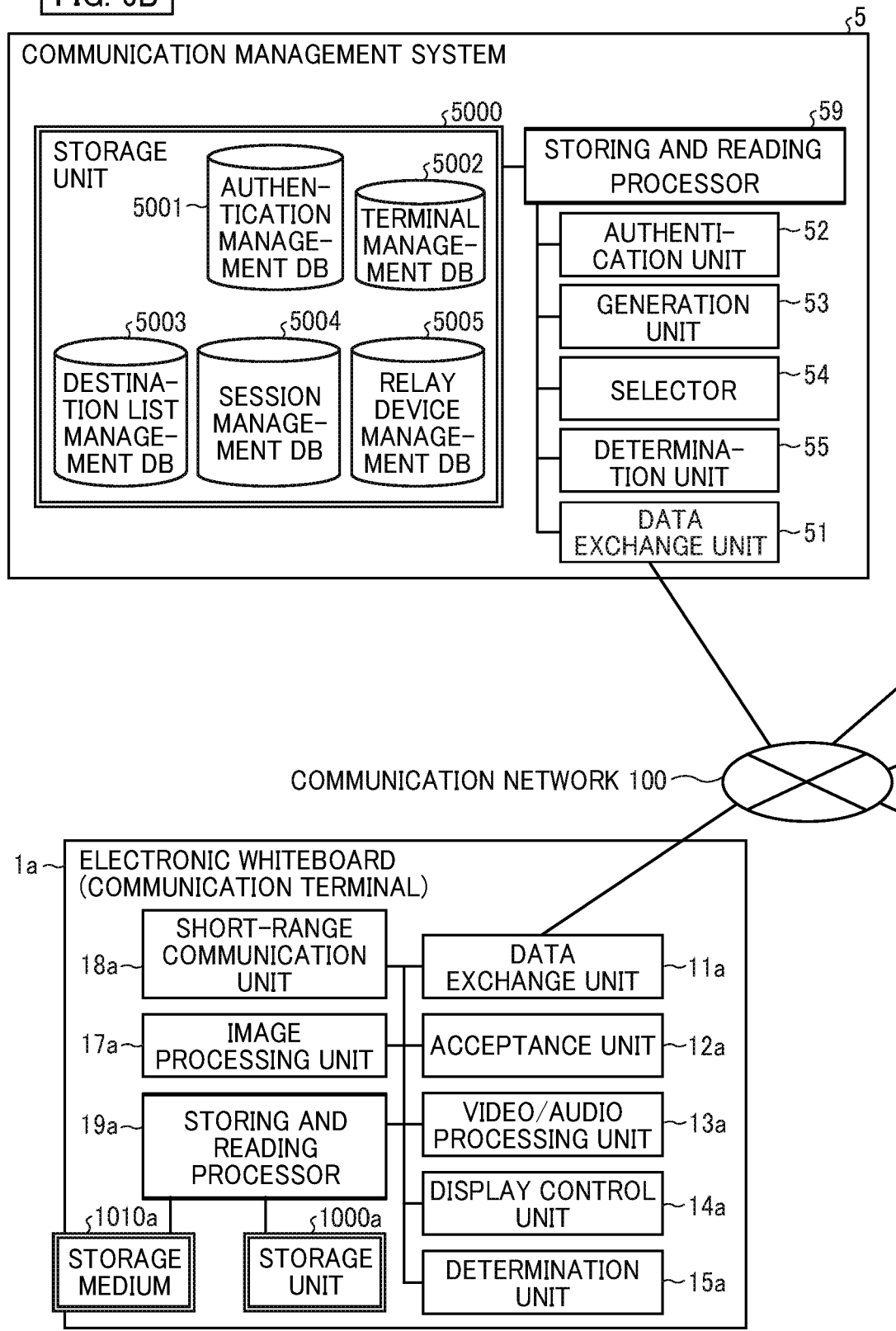

FIG. 7

AUTHENTICATION MANAGEMENT TABLE

| TERMINAL ID | PASSWORD |
|---|---|
| 01aa | aaaa |
| 01ab | abab |
| 01ba | baba |
| ... | ... |

FIG. 8

TERMINAL MANAGEMENT DB

| TERMINAL ID | TERMINAL NAME | OPERATION STATUS | RECEPTION DATE AND TIME | TERMINAL IP ADDRESS |
|---|---|---|---|---|
| 01aa | JAPAN TOKYO OFFICE TERMINAL AA | ONLINE (READY) | 2015.4.10.13:40 | 1.2.1.3 |
| 01ab | JAPAN TOKYO OFFICE MR./MS. AB | ONLINE (BUSY) | 2015.4.09.12:00 | 1.2.1.4 |
| 01ac | JAPAN TOKYO OFFICE MR./MS. AC | OFFLINE | 2015.4.09.12:30 | 1.2.1.5 |
| ⋮ | ⋮ | ⋮ | ⋮ | ⋮ |
| 01ba | CHINA BEIJING OFFICE TERMINAL BA | ONLINE (READY) | 2015.4.10.13:45 | 1.2.2.3 |
| 01bb | CHINA BEIJING OFFICE MR./MS. BB | ONLINE (TEMPORARY BLOCKED) | 2015.4.10.13:50 | 1.2.2.4 |
| ⋮ | ⋮ | ⋮ | ⋮ | ⋮ |
| 01ca | US WASHINGTON DC OFFICE TERMINAL CA | OFFLINE | 2015.4.10.12:45 | 1.3.1.3 |
| 01cb | US WASHINGTON DC OFFICE MR./MS. CB | ONLINE (BUSY) | 2015.4.10.13:55 | 1.3.1.4 |
| ⋮ | ⋮ | ⋮ | ⋮ | ⋮ |
| 01da | EUROPE BERLIN OFFICE TERMINAL DA | ONLINE (BUSY) | 2015.4.08.12:45 | 1.3.2.3 |
| 01db | EUROPE BERLIN OFFICE MR./MS. DB | ONLINE (READY) | 2015.4.10.12:45 | 1.3.2.4 |
| ⋮ | ⋮ | ⋮ | ⋮ | ⋮ |

FIG. 9

DESTINATION LIST MANAGEMENT TABLE

| SOURCE TERMINAL ID | DESTINATION TERMINAL ID |
|---|---|
| 01aa | 01ab,⋯,01ba,01bb,⋯,01ca,01cb,01da,01db,⋯ |
| 01ab | 01aa,01ca,01cb,01da |
| ⋯ | ⋯ |
| 01ba | 01aa,01ab,01ca,01cb,01da,01db |
| ⋯ | ⋯ |
| 01da | 01aa,01ab,01ba,⋯,01da,01ca,01cb,⋯,01db |

FIG. 10

SESSION MANAGEMENT TABLE

| SESSION ID | RELAY DEVICE ID | SOURCE TERMINAL ID | DESTINATION TERMINAL ID | DELAY TIME | DELAY INFORMATION RECEPTION DATE AND TIME |
|---|---|---|---|---|---|
| se01 | 111a | 01aa | 01db | 200 | 2015.4.10.13:41 |
| se02 | 111a | 01ba | 01cb | 50 | 2015.4.10.12:01 |
| ⋯ | | | | ⋯ | ⋯ |

FIG. 11

RELAY DEVICE MANAGEMENT TABLE

| RELAY DEVICE ID | OPERATION STATUS | RECEPTION DATE AND TIME | RELAY DEVICE IP ADDRESS | MAXIMUM DATA TRANSMISSION SPEED (Mbps) |
|---|---|---|---|---|
| 111a | ONLINE | 2014.4.10.13:00 | 1.2.1.2 | 100 |
| 111b | OFFLINE | 2014.4.10.13:10 | 1.2.2.2 | 1000 |
| 111c | ONLINE | 2014.4.10.13:20 | 1.3.1.2 | 100 |
| 111d | ONLINE | 2014.4.10.13:30 | 1.3.2.2 | 10 |

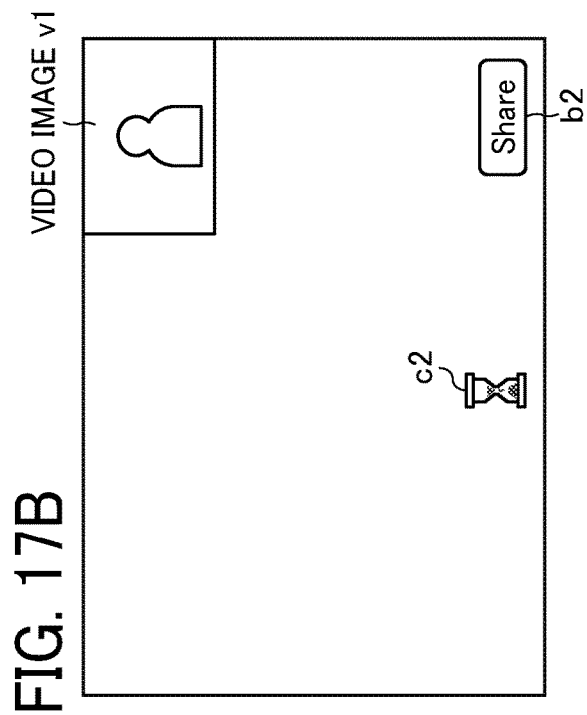
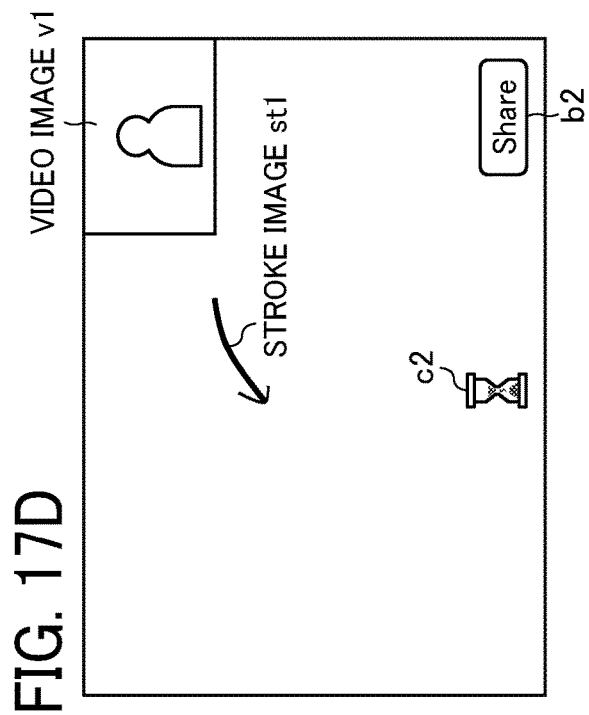
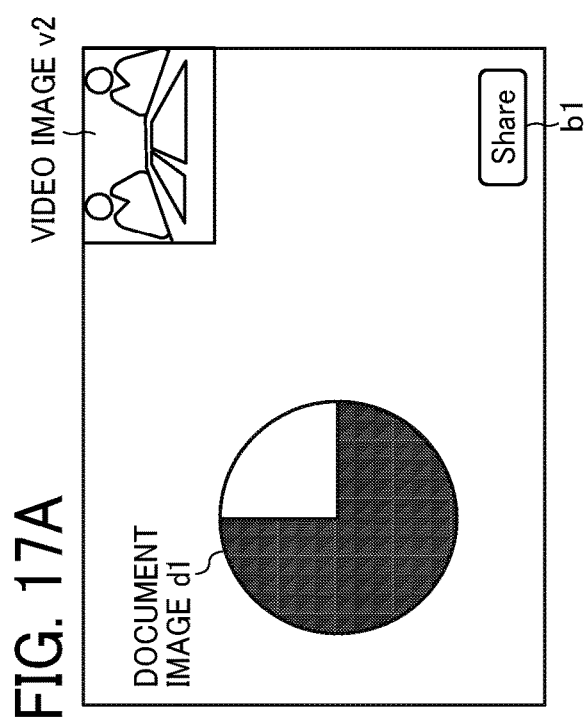
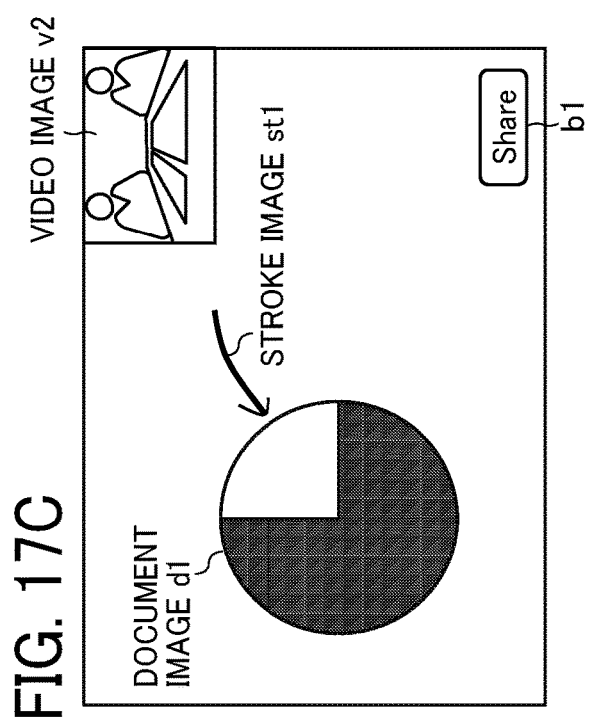

COMMUNICATION MANAGEMENT SYSTEM, COMMUNICATION SYSTEM, COMMUNICATION CONTROL METHOD, AND RECORDING MEDIUM

CROSS-REFERENCE TO RELATED APPLICATIONS

This patent application is based on and claims priority pursuant to 35 U.S.C. § 119(a) to Japanese Patent Applications No. 2018-225978, filed on Nov. 30, 2018, and No. 2019-209746 on Nov. 20, 2019 in the Japan Patent Office, the entire disclosure of which is hereby incorporated by reference herein.

BACKGROUND

Technical Field

The present disclosure relates to a communication management system, a communication system, a communication control method, and a recording medium.

Background Art

Communication systems that communicate with remote locations through communication networks such as the internet have become widespread. Examples of the communication system include a conference system that performs a video conference. In a general conference system, a communication terminal used by one of parties involved in the video conference converts an image or sound of a subject in a conference room into digital data and transmits the digital data to a communication terminal used by the other party. Next, the communication terminal used by the other party displays an image on a display and outputs a sound from a speaker. This enables to carry out a conference among remote sites, in a state close to an actual conference. Furthermore, it is possible to share image data by transmitting image data indicating documents or the like being held or displayed on one communication terminal to the other communication terminal through a communication network.

SUMMARY

Embodiments of the present disclosure describe a communication management system, a communication system, a communication control method, and a recording medium. The communication management system manages sharing of data between a plurality of communication terminals and transmits storage location information indicating a storage location of image data, the storage location information to be received by a first communication terminal of the plurality of communication terminals, receives a notice indicating a start of uploading of the image data to the storage location indicated by the storage location information, the notice transmitted by the first communication terminal, transmits the notice indicating the start of uploading of the image data, the notice to be received by a second communication terminal of the plurality of communication terminals, receives stroke data for reproducing a stroke image, the stroke data transmitted by the first communication terminal, and transmits the stroke data, the stroked data to be received by the second communication terminal.

BRIEF DESCRIPTION OF THE DRAWINGS

A more complete appreciation of the embodiments and many of the attendant advantages and features thereof can be readily obtained and understood from the following detailed description with reference to the accompanying drawings, wherein:

FIG. 6A and FIG. 6B are functional block diagrams of a communication system according to embodiments of the present disclosure:

FIG. 7 is a conceptual diagram illustrating an authentication management table;

FIG. 8 is a conceptual diagram illustrating a terminal management table;

FIG. 9 is a conceptual diagram illustrating a destination list management table;

FIG. 10 is a conceptual diagram illustrating a session management table;

FIG. 11 is a conceptual diagram illustrating a relay device management table;

FIG. 17A is a diagram illustrating an example of a screen on the electronic whiteboard;

FIG. 17B is a diagram illustrating an example of the screen on the electronic whiteboard;

FIG. 17C is a diagram illustrating an example of the screen on the electronic whiteboard; and FIG. 17D is a diagram illustrating an example of the screen on the electronic whiteboard.

Figure 1:
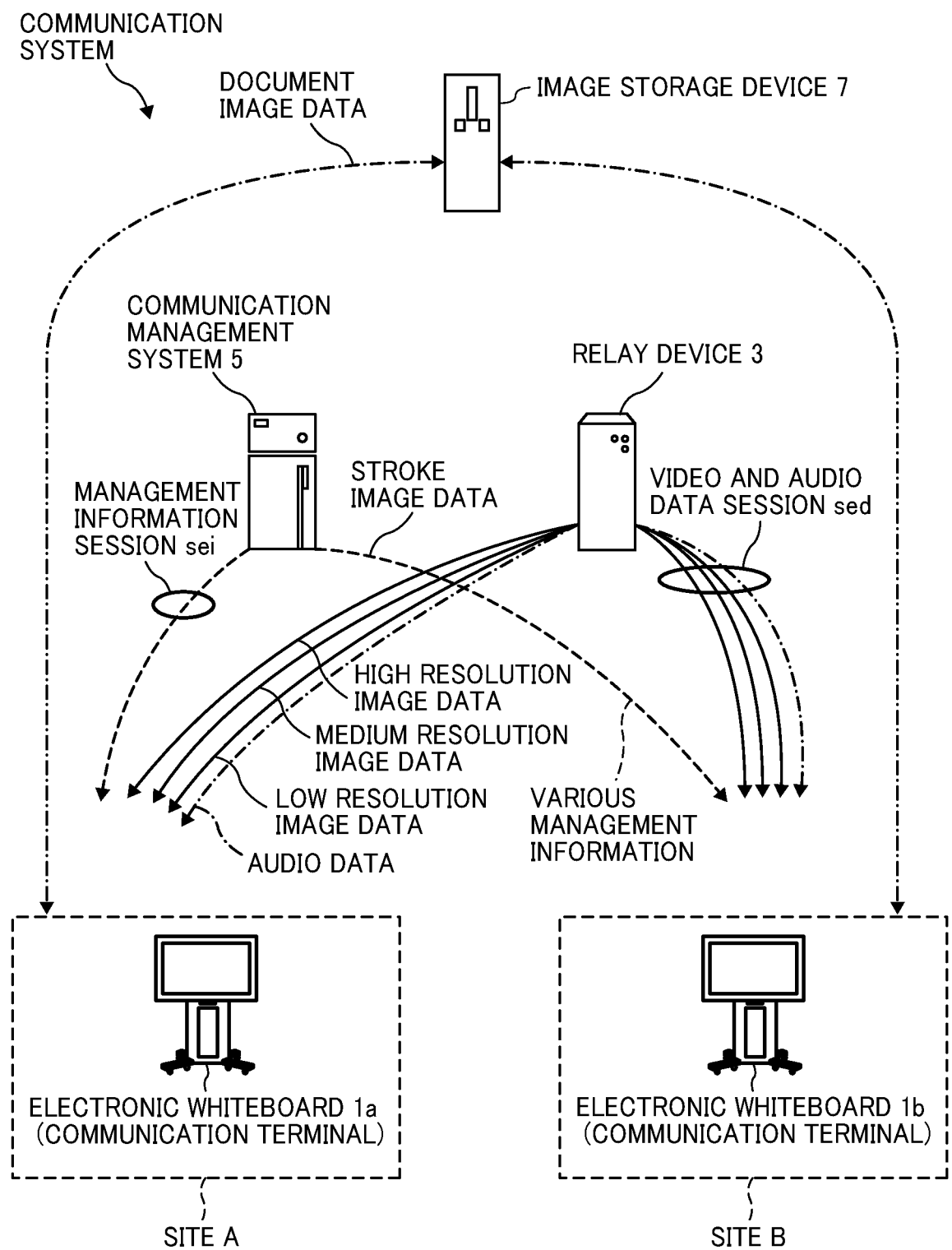
FIG. 1 is a schematic diagram illustrating a communication route according to embodiments of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

As used herein, the singular forms "a", "an", and "the" are intended to include the plural forms as well, unless the context clearly indicates otherwise.

Hereinafter, an embodiment of the present disclosure is described with reference to the drawings.

A communication system for conducting a video conference between a plurality of electronic whiteboards 1a and 1b while enabling one or more users to draw drawing images on the electronic whiteboards is described with reference to FIG. 1 FIG. 1 is a schematic diagram illustrating a communication route according to the present embodiment. The "video conference" may be called a "teleconference". Here, a video conference is described as an example, and other examples may be a meeting or a simple conversation.

The communication system of FIG. 1 includes a plurality of electronic whiteboards 1a and 1b, a relay device 3, a communication management system 5, and an image storage device 7. The electronic whiteboards 1a and 1b perform mutual communication of video data and audio data for calls, and content data such as image data and stroke data for sharing. The stroke data is data necessary for reproducing a stroke image, and includes coordinate data, line width data, line color data, vector data, and the like. The electronic whiteboards 1a and 1b can make a remote video call by reproducing the video and sound of the other party based on video data and audio data received from the other party, and transmitting video data and audio data to be reproduced at the other party.

The electronic whiteboards 1a and 1b transmit and receive image data of a document image to enable participants who use the communication system to share the same document image. The document image is any image displayed on the display of the electronic whiteboard 1a or 1b, and is, for example, an image of a conference-related document to be used during the conference such as presentation materials, a background image displayed on the display, a capture screen that is the display screen being captured, or the like. In addition, the electronic whiteboards 1a and 1b transmit and receive stroke data of a stroke image, to enable the participants who use the communication system to share the same stroke image. The stroke image is a line or the like, drawn by a user with a handwritten stroke with an electronic pen or the like. The stroke image is displayed based on stroke data indicating points each specifying coordinates on the display.

The communication system may not only include the two electronic whiteboards 1a and 1b, but may include three or more electronic whiteboards. Hereinafter, the electronic whiteboards 1a and 1b are collectively referred to as "electronic whiteboard 1" when it is not necessary to distinguish between the electronic whiteboards 1a and 1b.

FIG. 1 illustrates an electronic whiteboard equipped with a video conference function as an example of the electronic whiteboards 1a and 1b. The image of the video data may be a moving image or a still image.

In this disclosure, an electronic whiteboard requesting the start of a video conference is called a "source terminal", and an electronic whiteboard which is a request destination is called a "destination terminal". In FIG. 1, the electronic whiteboard 1a is the source terminal and the electronic whiteboard 1b is the destination terminal. When the start of the video conference is requested from the electronic whiteboard 1b, the electronic whiteboard 1b becomes the source terminal and the electronic whiteboard 1a becomes the destination terminal. Note that the electronic whiteboards 1a and 1b may be used not only for communication between different offices or for communication between different rooms in the same office, but also for communication within the same room or for outdoor-indoor communication or outdoor-outdoor communication.

The relay device 3 is implemented by one or more computers and executes a process of relaying content data for a call between the plurality of electronic whiteboards 1a and 1b.

The communication management system 5 is implemented by one or more computers and centrally controls login authentication from the electronic whiteboards 1a and 1b, the communication status of each of the electronic whiteboards 1a and 1b, a destination list, the communication status of the relay device 3, and the like. Further, the communication management system 5 relays stroke data to be shared between the plurality of electronic whiteboards 1a and 1b.

The image storage device 7, which is implemented by one or more computers, stores image data of a document image uploaded from the electronic whiteboard 1a and causes the electronic whiteboard 1b to download the image data to the electronic whiteboard 1b. The reverse can also be performed. That is, the image storage device 7 stores the image data uploaded from the electronic whiteboard 1b and causes the image data to be downloaded to the electronic whiteboard 1a.

The relay device 3, the communication management system 5, and the image storage device 7 may each be implemented by a single computer or may be implemented by a plurality of computers.

In the communication system of FIG. 1, a management information session sei for exchanging various types of management information is established between the electronic whiteboards 1a and 1b through the communication management system 5. In addition, four sessions are established between the electronic whiteboards 1a and 1b to exchange four types of data including high resolution image data, medium resolution image data, low resolution image data, and audio data through the relay device 3. In FIG. 1, these four sessions are collectively referred to as a video and audio data session sed. Note that the video and audio data session sed does not necessarily have to be four sessions and may have a smaller or larger number of sessions than the four sessions. In addition, a communication session may be established directly between the source terminal and the destination terminal without using the relay device 3.

Further, in the communication system of FIG. 1, stroke data can be exchanged between the electronic whiteboards 1a and 1b using the management information session sei.

The video resolution of the video data handled in the present embodiment is described below. For example, the low-resolution video data consists of 160 pixels in the horizontal direction and 120 pixels in the vertical direction and becomes a base image. The medium resolution video data consists of 320 pixels in the horizontal direction and 240 pixels in the vertical direction. The high-resolution video data consists of, for example, 640 pixels in the horizontal direction and 480 pixels in the vertical direction. Among these, when passing through a narrow band route, a low quality base image consisting only of low-resolution video data is relayed. When the bandwidth is relatively wide, medium-quality video data consisting of low-resolution video data serving as a base image and medium-resolution video data are relayed. When the bandwidth is very wide, high-quality video data consisting of low-resolution video data, medium-resolution video data, and high-resolution video data serving as a base image is relayed. Since the audio data has a smaller data size than the video data, audio data is relayed even on the narrow band route.

Figure 2:
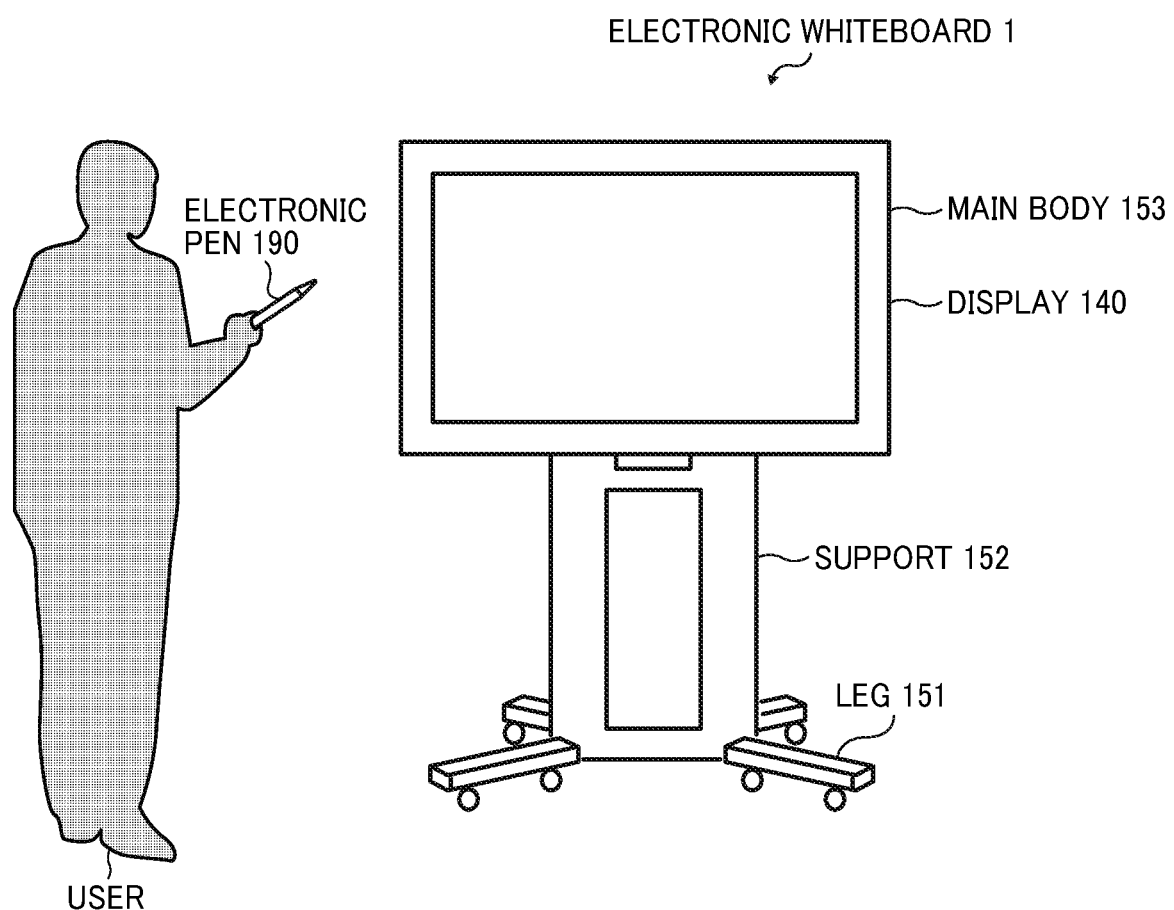
FIG. 2 is an illustration for explaining how an electronic whiteboard is used.

FIG. 2 is an illustration for explaining how an electronic whiteboard is used. As illustrated in FIG. 2, the electronic whiteboard 1 includes a plurality of legs 151 each having a plurality of casters on the lower side, a support 152 provided on the upper side of the legs 151, and a main body 153 provided on top of the support 152, and a display 180 provided on the front surface of the main body 153. The main body 153 includes a CPU 101 and the like which is described below. The user can input (draw) a stroke image such as a character on the display 180 using the electronic pen 190.

A description is given hereinafter of a hardware configuration according to the present embodiment.

Figure 3:
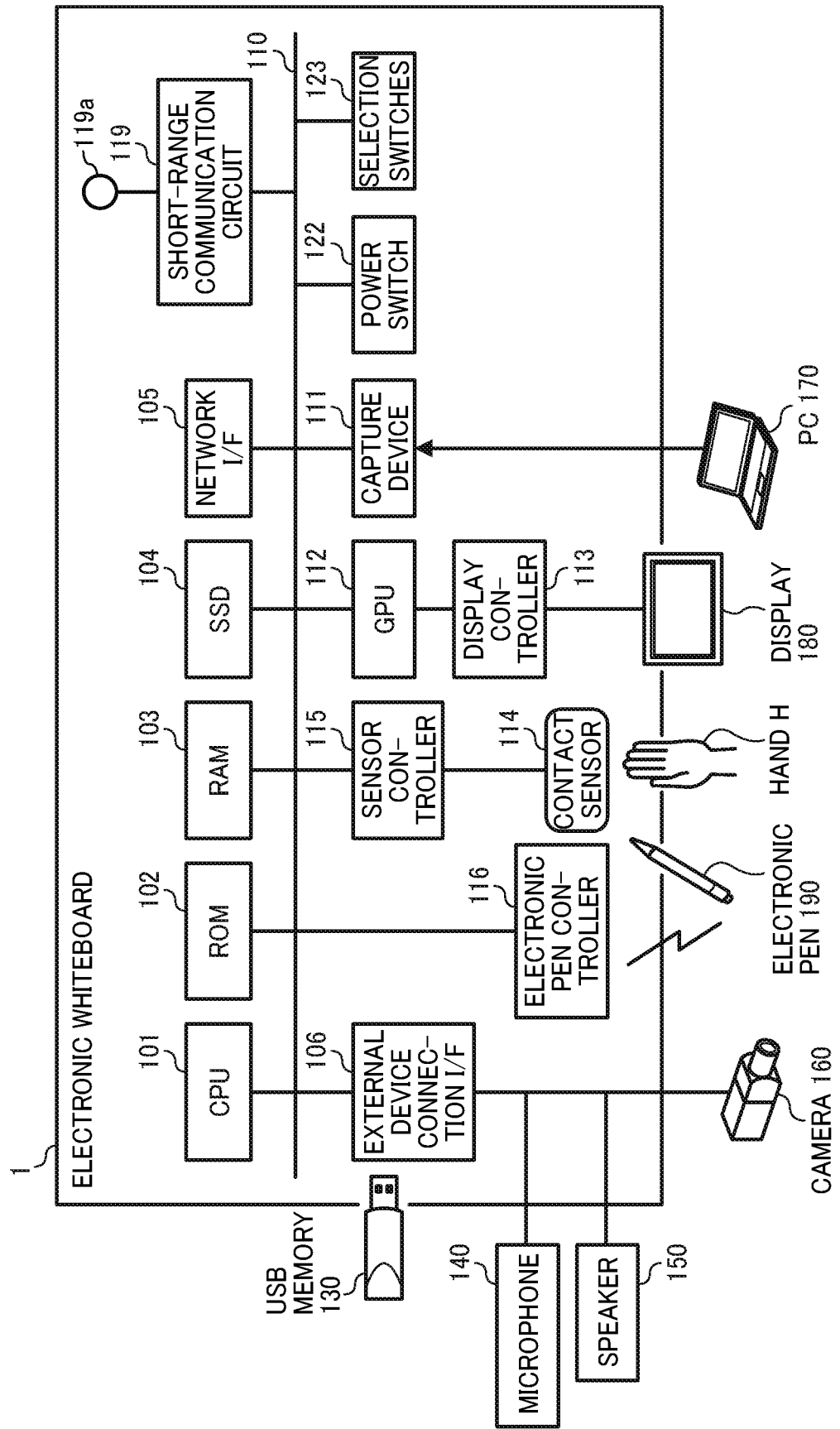
FIG. 3 is a block diagram illustrating a hardware configuration of the electronic whiteboard according to embodiments of the present disclosure.

FIG. 3 is a block diagram illustrating a hardware configuration of the electronic whiteboard 1. As illustrated in FIG. 3, the electronic whiteboard 1 includes a central processing unit (CPU) 101, a read only memory (ROM) 102, a random access memory (RAM) 103, a solid state drive (SSD) 104, a network interface (I/F) 105 and an external device connection I/F 106.

Among these hardware components, the CPU 101 controls the entire operation of the electronic whiteboard 1. The ROM 102 stores programs used for driving the CPU 101 such as the initial program loader (IPL). The RAM 103 is used as a work area for the CPU 101. The SSD 104 stores various data such as a control program for the electronic whiteboard 1. The network I/F 105 is an interface for connecting with a communication network 100. The external device connection IF 106 is an interface for connecting various external devices. External devices in this case are, for example, a Universal Serial Bus (USB) memory 130 and external devices (a microphone 140, a speaker 150, and a camera 160).

The electronic whiteboard 1 further includes a capture device 11l, a graphics processing unit (GPU) 112, a display controller 113, a contact sensor 114, a sensor controller 115, an electronic pen controller 116, a short-range communication circuit 119, an antenna 119a of the short-range communication circuit 119, a power switch 122, and selection switches 123.

Among these hardware components, the capture device 111 displays video information as a still image or a moving image on the display of an external personal computer (PC) 170. The GPU 112 is a semiconductor chip dedicated to graphics processing. The display controller 113 controls display of screens to output an output image from the GPU 112 to the display 180 or the like. The contact sensor 114 detects a touch onto the display 180 with the electronic pen 190 or a user's hand H. The sensor controller 115 controls operation of the contact sensor 114. The contact sensor 114 senses a touch input to a specific coordinate on the display 180 using the infrared blocking system. More specifically, the display 180 is provided with two light receivers/emitters respectively disposed on upper side ends of the display 180, and a reflector frame surrounding the sides of the display 180. The light receivers/emitters emit a plurality of infrared rays in parallel to a surface of the display 180. Light receiving elements, of the light receivers/emitters, receive lights passing in the direction that is the same as an optical path of the emitted infrared rays, which are reflected by the reflector frame. The contact sensor 114 outputs an identifier (ID) of the infrared ray that is blocked by an object after being emitted from the two light receiving elements, to the sensor controller 115. Based on the ID of the infrared ray, the sensor controller 115 detects a specific coordinate that is touched by the object. The electronic pen controller 116 communicates with the electronic pen 190 to detect a touch by the tip or bottom of the electronic pen 190 to the display 180. The short-range communication circuit 119 is a communication circuit that communicates data in compliance with such as Near Field Communication (NFC), Bluetooth (registered trademark) and the like. The power switch 122 is a switch that turns on or off the power of the electronic whiteboard 1. The selection switches 123 are a group of switches for adjusting brightness, hue, etc., of display on the display 180, for example.

The electronic whiteboard 1 further includes a bus line 110. The bus line 110 is an address bus, a data bus or the like, which electrically connects the elements in FIG. 3 such as the CPU 101.

The contact sensor 114 is not limited to the infrared blocking system type, and may be a different type of detector, such as a capacitance touch panel that identifies the contact position by detecting a change in capacitance, a resistance film touch panel that identifies the contact position by detecting a change in voltage of two opposed resistance films, or an electromagnetic induction touch panel that identifies the contact position by detecting electromagnetic induction caused by contact of an object to a display. In addition, or in alternative to detecting a touch by the tip or bottom of the electronic pen 190, the electronic pen controller 116 may also detect a touch by another part of the electronic pen 190, such as a part held by a hand of the user.

Figure 4:
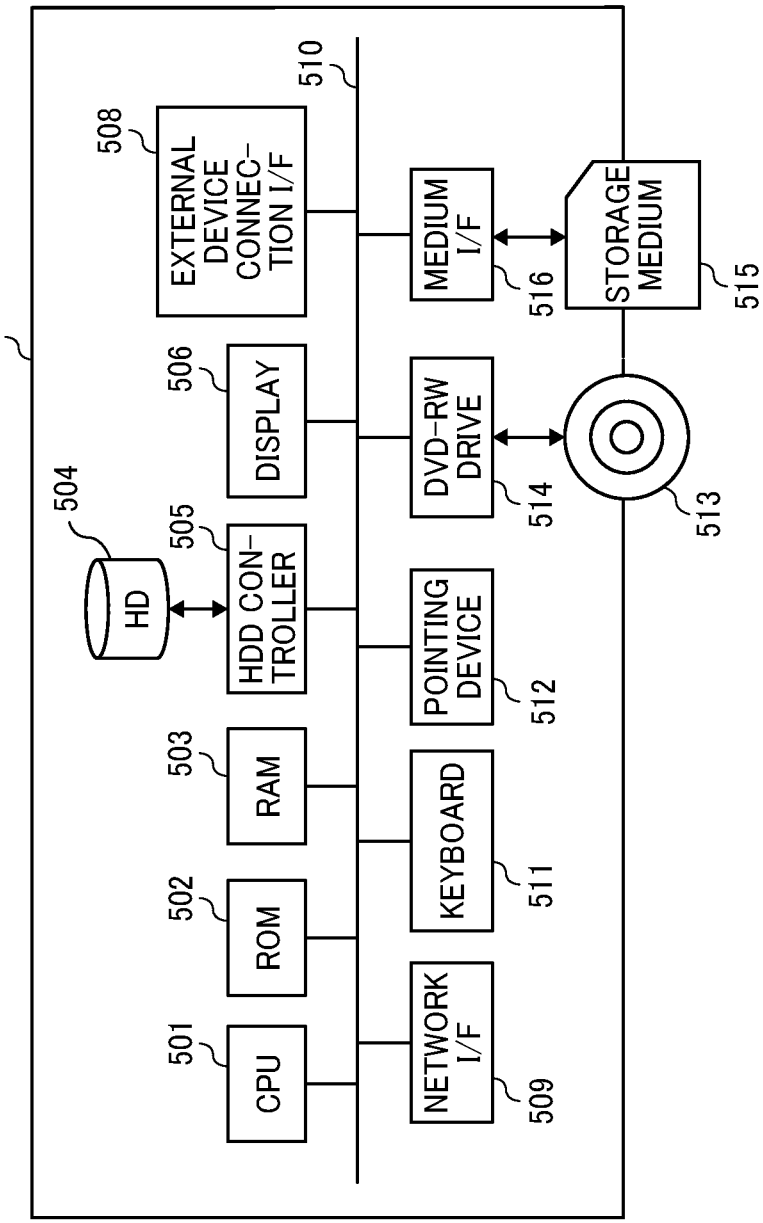
FIG. 4 is a block diagram illustrating a hardware configuration of a communication management system, a relay device, and an image storage device according to embodiments of the present disclosure.

FIG. 4 is a block diagram illustrating a hardware configuration of a communication management system 5 according to embodiments of the present disclosure. A computer as an example of the communication management system 5 includes a CPU 501, a ROM 502, a RAM 503, a hard disk (HD) 504, a hard disk drive (HDD) controller 505, a display 506, an external device connection I/F 508, a network I/F 509, a keyboard 511, a pointing device 512, a Digital Versatile Disk-ReWritable (DVD-RW) drive 514, a medium I/F 516, and a bus line 510.

The CPU 501 controls entire operation of the communication management system 5. The ROM 502 stores a control program such as an IPL to boot the CPU 501.

The RAM 503 is used as a work area for the CPU 501. The HD 504 stores various data such as programs for the communication management. The HDD controller 505 controls reading and writing of various data from and to the HD 504 under control of the CPU 501. The display 506 displays various information such as a cursor, menu, window, characters, or image. The external device connection L/F 508 is an interface for connecting various external devices. The network I/F 509 is an interface for performing data communication using the communication network 100 such as the internet. The keyboard 511 is one example of an input device (input means) provided with a plurality of keys for allowing a user to input characters, numerals, or various instructions. The pointing device 512 is one example of an input device (input means) that allows a user to select a specific instruction or execution, select a target for processing, or move a cursor being displayed. The DVD-RW drive 514 controls reading or writing (storage) of data to the DVD-RW. Alternatively, the DVD-RW drive 514 may control the reading or writing (storage) of data to a disc such as a Blu-ray Disc Rewritable (BD-RE) instead of the DVD-RW drive. The medium I/F 516 controls reading and writing (storing) of data from and to the storage medium 515 such as a flash memory.

The bus line 510 is an address bus, a data bus or the like, which electrically connects the elements illustrated in FIG. 4 such as the CPU 501.

The hardware configurations of the relay device 3 and the image storage device 7 illustrated in FIG. 1 are the same as the hardware configuration of the communication management system 5, and thus the description thereof is omitted. However, in the case of the relay device 3, the relay program is stored in the HD 504. In the case of the image storage device 7, an image storage program is stored in the HD 504.

Figure 5:
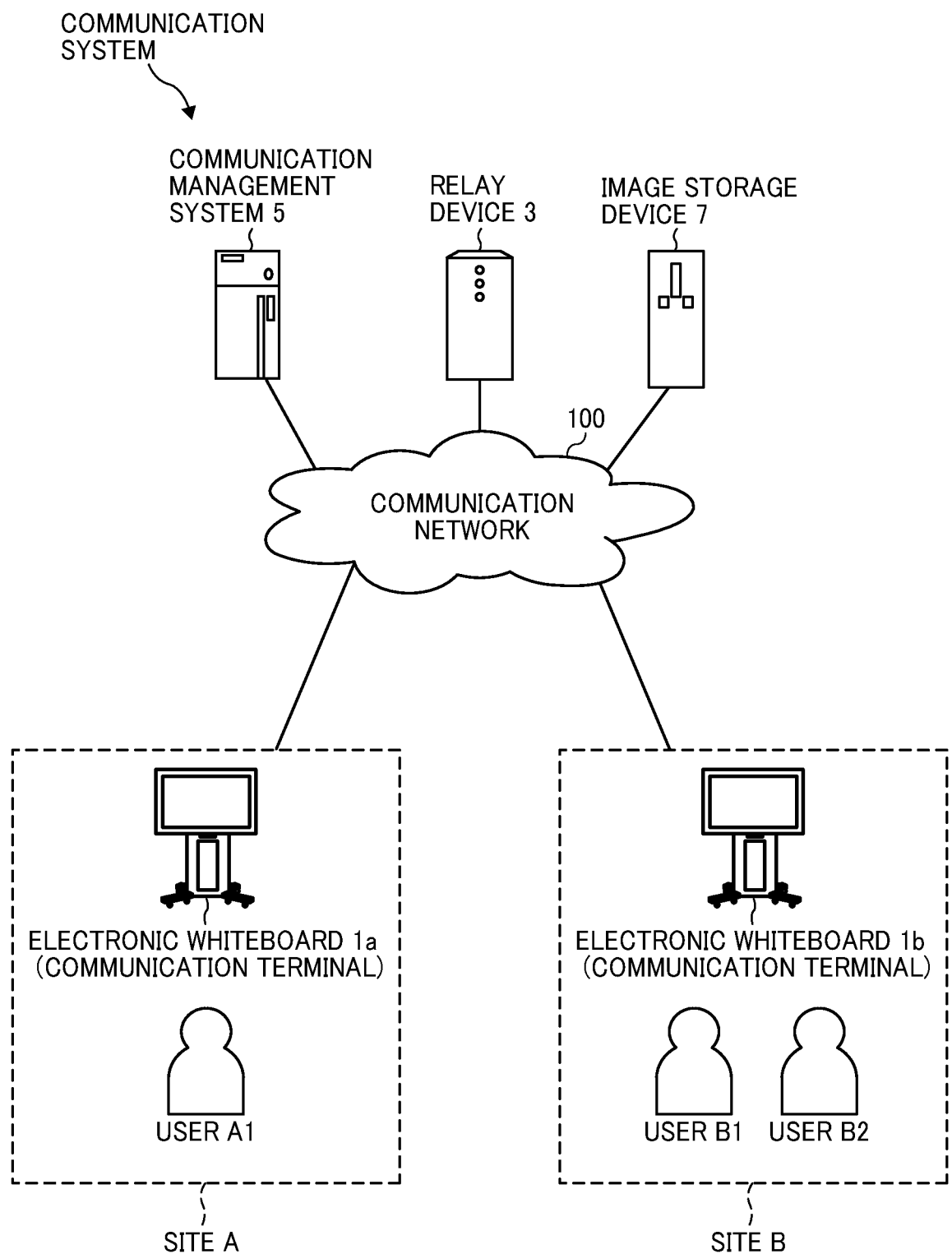
FIG. 5 is a schematic diagram illustrating a communication system according to embodiments of the present disclosure.

An overall configuration of the communication system is described with reference to FIG. 5. FIG. 5 is a schematic diagram illustrating the communication system according to embodiments of the present disclosure.

In FIG. 5, the electronic whiteboard 1a is provided at a site A and the electronic whiteboard 1b is provided at a site B. For example, the site A is a Tokyo office in Japan and the site B is an Osaka office in Japan. The user A1 uses the electronic whiteboard 1a at the site A. and the users B1 and B2 use the electronic whiteboard 1b at the site B.

The electronic whiteboards 1a and 1b, the relay device 3, the communication management system 5, and the image storage device 7 can perform mutual communication of data through the communication network 100 such as the internet.

The communication network 100 may include a wireless communication.

The electronic whiteboards 1a and 1b illustrated in FIG. 5 are both electronic whiteboards capable of performing video communication.

Figure 6B:
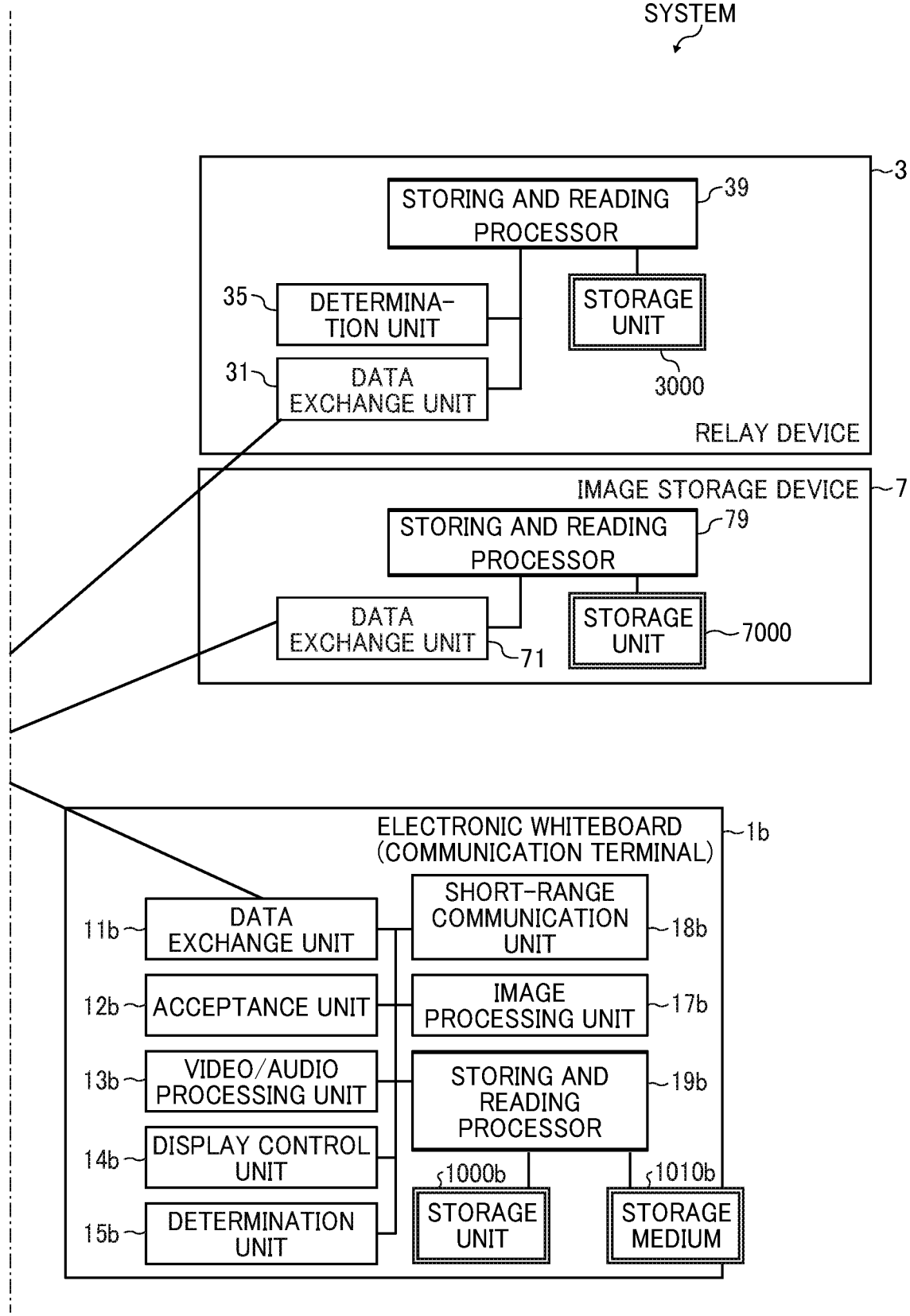

Next, a functional configuration of the communication system of FIG. 5 according to embodiments of the present disclosure is described with reference to FIGS. 6A to 11. FIG. 6A and FIG. 6B are functional block diagrams of the communication system of FIG. 5 according to embodiments of the present disclosure.

As illustrated in FIG. 6A, the electronic whiteboard 1a includes a data exchange unit 11a, an acceptance unit 12a, a video/audio processing unit 13a, a display control unit 14a, a determination unit 15a, an image processing unit 17a, a short-range communication unit 18a, and a storing and reading processor 19a. These units are functions implemented by or caused to function by operating any of the hardware elements illustrated in FIG. 3 in cooperation with the instructions of the CPU 101 according to the control program expanded from the SSD 104 to the RAM 103. The electronic whiteboard 1a further includes a storage unit 1000a, which is implemented by the RAM 103 illustrated in FIG. 3 and the SSD 104 illustrated in FIG. 3.

Functional units of the electronic whiteboard 1a is described below. The data exchange unit 11a exchanges various data (or information) with other terminals, apparatuses, systems, etc. through the communication network 100. Further, the data exchange unit 11a also serves as a start unit and executes a process for starting communication with another communication terminal such as the electronic whiteboard 1b. The acceptance unit 12a accepts various inputs from the user using the electronic pen 190 or the like.

The video/audio processing unit 13a performs main processing of the video conference function. For example, the video/audio processing unit 13a performs digital processing such as encoding of video data and audio data in accordance with the output signal of the microphone 140 and the output signal of the camera 160. The video/audio processing unit 13a generates a video signal based on the video data and an audio signal based on the audio data received by the data exchange unit 11a. The video/audio processing unit 13a performs processing for combining video data having different resolutions.

The display control unit 14a performs control for outputting a video signal (image signal) or the like to the display 180. The determination unit 15a makes various determinations.

The image processing unit 17a performs main processing of the electronic whiteboard function. For example, the image processing unit 17a creates a stroke image and stroke data based on the stroke of the electronic pen 190 or the like accepted by the acceptance unit 12a or creates the stroke image based on the stroke data received by the data exchange unit 11a. The image processing unit 17a generates an image signal based on the image data of the document image received by the data exchange unit 11a.

The short-range communication unit 18a acquires and provides data by short-range wireless communication with each terminal having the short-range communication unit.

The storing and reading processor 19a stores various data in the storage unit 1000a, or the storage medium 1010a such as the USB memory 130 and reads various types of data stored in the storage unit 1000a or the storage medium 1010a.

Further, every time image data and audio data are received in performing communication with other terminal, the storage unit 1000a overwrites the image data and audio data. The display 180 displays an image based on image data before being overwritten, and the speaker 150 outputs sound based on audio data before being overwritten.

As illustrated in FIG. 6B, the electronic whiteboard 1b includes a data exchange unit 11b, an acceptance unit 12b, a video/audio processing unit 13b, a display control unit 14b, a determination unit 15b, an image processing unit 17b, a short-range communication unit 18b, and a storing and reading processor 19b. The data exchange unit 11b, the acceptance unit 12b, the video/audio processing unit 13b, the display control unit 14b, the determination unit 15b, the image processing unit 17b, the short-range communication unit 18b, and the storing and reading processor 19b have the same functions as the data exchange unit 11a, the acceptance unit 12a, the video/audio processing unit 13a, the display control unit 14a, the determination unit 15a, the image processing unit 17a, the short-range communication unit 18a, and the storing and reading processor 19a, therefore, the description thereof is omitted.

As illustrated in FIG. 6B, the relay device 3 includes a data exchange unit 31 that also serves as a transfer unit, a determination unit 35, and a storing and reading processor 39. These units are functions implemented by or caused to function by operating any of the elements illustrated in FIG. 4 in cooperation with the instructions of the CPU 501 according to the terminal control program expanded from the HD 504 to the RAM 503. Further, the relay device 3 includes a storage unit 3000 implemented by the RAM 503 and the HD 504 illustrated in FIG. 4.

Functional units of the relay device 3 is described below in detail. The data exchange unit 31 of the relay device 3 illustrated in FIG. 6B exchanges various data (or information) with other terminals, devices, or systems through the communication network 100. The data exchange unit 31 also serves as a transfer unit, and transfers video data and audio data transmitted from one terminal to another terminal. The determination unit 35 performs various determinations such as determination of whether data transmission is delayed.

The storing and reading processor 39 stores various types of data in the storage unit 3000 or reads various types of data stored in the storage unit 3000.

As illustrated in FIG. 6A, the communication management system 5 includes a data exchange unit 51, an authentication unit 52, a generation unit 53, a selector 54, a determination unit 55, and a storing and reading processor 59. These units are functions implemented by or caused to function by operating any of the elements illustrated in FIG. 4 in cooperation with the instructions of the CPU 501 according to the terminal control program expanded from the HD 504 to the RAM 503. Further, the communication management system 5 includes a storage unit 5000 implemented by HD 504 illustrated in FIG. 4.

FIG. 7 is a conceptual diagram illustrating an authentication management table. The authentication management table illustrated in FIG. 7 is stored in an authentication management database (DB) 5001 included in the storage unit 5000. In the authentication management table, a terminal ID and a password are associated for each of all the electronic whiteboards 1 managed by the communication management system 5. For example, the authentication management table illustrated in FIG. 7 indicates that the terminal ID of the electronic whiteboard 1a (communication terminal) is "01 aa" and the password is "aaaa". The password is an example of authentication information, and the authentication information includes an access token.

FIG. 8 is a conceptual diagram illustrating a terminal management table. The terminal management table illustrated in FIG. 8 is stored in the terminal management DB 5002 included in the storage unit 5000. For each terminal ID for identifying each electronic whiteboard 1 (communication terminal), a terminal name to be used when each electronic whiteboard 1 is a destination terminal, an operating status of each electronic whiteboard 1, reception date and time when login request described below is received by the communication management system 5, and the internet protocol (IP) address of each electronic whiteboard 1 (communication terminal) are managed in association with each other in the terminal management table. For example, in the terminal management table illustrated in FIG. 8, the electronic whiteboard 1a with the terminal ID "01 aa" has the terminal name "JAPAN TOKYO OFFICE TERMINAL AA" and the operating status "ON LINE (READY)". The date and time when the login request is received by the communication management system 5 is "13:40 on Apr. 10, 2015" and the IP address of the terminal 01aa is "1.2.1.3". Note that the terminal ID, the terminal name, and the IP address of the terminal are stored when each electronic whiteboard 1 is pre-registered to receive service provided by the communication management system 5.

FIG. 9 is a conceptual diagram illustrating a destination list management table. The destination list management table illustrated in FIG. 9 is stored in the destination list management DB 5003 included in the storage unit 5000. In the destination list management table, all terminal IDs registered as candidates for the destination terminal (electronic whiteboard 1) are stored in association with the terminal ID of the source terminal (electronic whiteboard 1) that requests the start of communication. For example, in the destination list management table illustrated in FIG. 9, the destination terminal candidates that the source terminal (electronic whiteboard 1a) whose terminal ID is "01aa" can request the start of communication are the electronic whiteboard 1b having the terminal ID "0 lab" and the like. This destination terminal candidate is updated by being added or deleted by an addition or deletion request to the communication management system 5 from any source terminal.

The destination list is an example of destination information, and the destination information may not be in a list format, as long as information on destination such as a terminal ID can be obtained.

FIG. 10 is a conceptual diagram illustrating a session management table. The session management table illustrated in FIG. 10 is stored in the session management DB 5004 included in the storage unit 5000. In the session management table, for each communication session ID for identifying a session to perform mutual communication between each electronic whiteboard (communication terminal) and the relay device 3, a relay device ID of the relay device 3 to be used, a source terminal ID of electronic whiteboard 1 (source terminal), a destination terminal ID of electronic whiteboard 1 (destination terminal), a delay time (ms) of reception when video data is received at the destination terminal, and reception date and time when delay information indicating the delay time is transmitted from the destination terminal and received by the communication management system 5 are stored in association with each other. For example, the session management table illustrated in FIG. 10 indicates that, in a communication session executed using the session ID "se01", the relay device with the relay device ID "111 a" relayed video data and audio data between the electronic whiteboard with the terminal ID "01aa" and the electronic whiteboard with the terminal ID "01db", and that the electronic whiteboard (destination terminal) received the video data with at "13:41 on Apr. 10, 2015" with the delay time of 200 ms.

FIG. 11 is a conceptual diagram illustrating a relay device management table. A relay device management table illustrated in FIG. 11 is stored in a relay device management DB 5005 included in the storage unit 5000. In the relay device management table, an operation status of each relay device 3, date and time when the communication management system 5 received the status information indicating the operation status, an IP address of the relay device 3, and maximum data transmission speed (Mbps) of the relay device 3 are stored in association with each relay device ID of a plurality of relay devices 3. For example, in the relay device management table illustrated in FIG. 11, the relay device 3 with the relay device ID "111a" has an operation status "ONLINE" and the date and time when the communication management system 5 received the operation status is "13:30 on Apr. 10, 2014", the IP address of the relay device 3 is "1.2.1.2", and the maximum data transmission speed of the relay device 3 is 100 Mbps.

The data exchange unit 51 of the communication management system 5 illustrated in FIG. 6A exchanges various data (or information) with other terminals, devices, or systems through the communication network 100.

The authentication unit 52 searches the authentication management DB 5001 of the storage unit 5000 using the terminal ID and password included in the login request received through the data exchange unit 51 as search keys and executes authentication by determining whether the same set of terminal ID and password are stored in the authentication management DB 5001. The generation unit 53 generates a session ID for identifying a communication session based on a communication start request from the electronic whiteboard 1 (described below as step S62). The selector 54 performs a process of selecting one relay device 3 from the plurality of relay devices 3. The determination unit 55 makes various determinations. The storing and reading processor 59 stores various types of data in the storage unit 5000 or reads various types of data stored in the storage unit 5000.

As illustrated in FIG. 6B, the image storage device 7 includes a data exchange unit 71 and a storing and reading processor 79. These units are functions implemented by or caused to function by operating any of the elements illustrated in FIG. 4 in cooperation with the instructions of the CPU 501 according to the image storage program expanded from the HD 504 to the RAM 503. Further, the image storage device 7 includes a storage unit 7000 implemented by the RAM 503 and the HD 504 illustrated in FIG. 4.

Functional units of the image storage device 7 is described below in detail.

The data exchange unit 71 of the image storage device 7 illustrated in FIG. 6B exchanges various data (or information) with other terminals, devices, or systems through the communication network 100. The storing and reading processor 79 stores various types of data in the storage unit 7000 or reads various types of data stored in the storage unit 7000.

Hereinafter, processes executed in the communication system according to the present embodiment is described with reference to FIGS. 12 to 17.

Figure 12A:
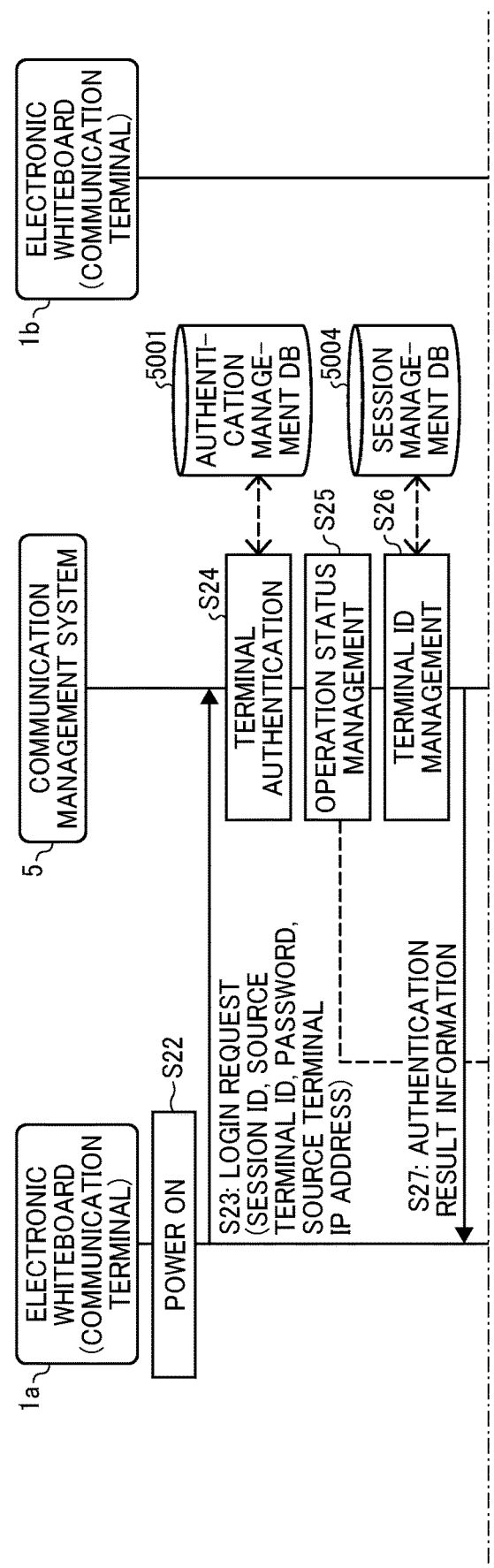
FIG. 12A and FIG. 12B are sequence diagrams illustrating a process for preparing to start remote communication between electronic whiteboards.
Figure 12B:
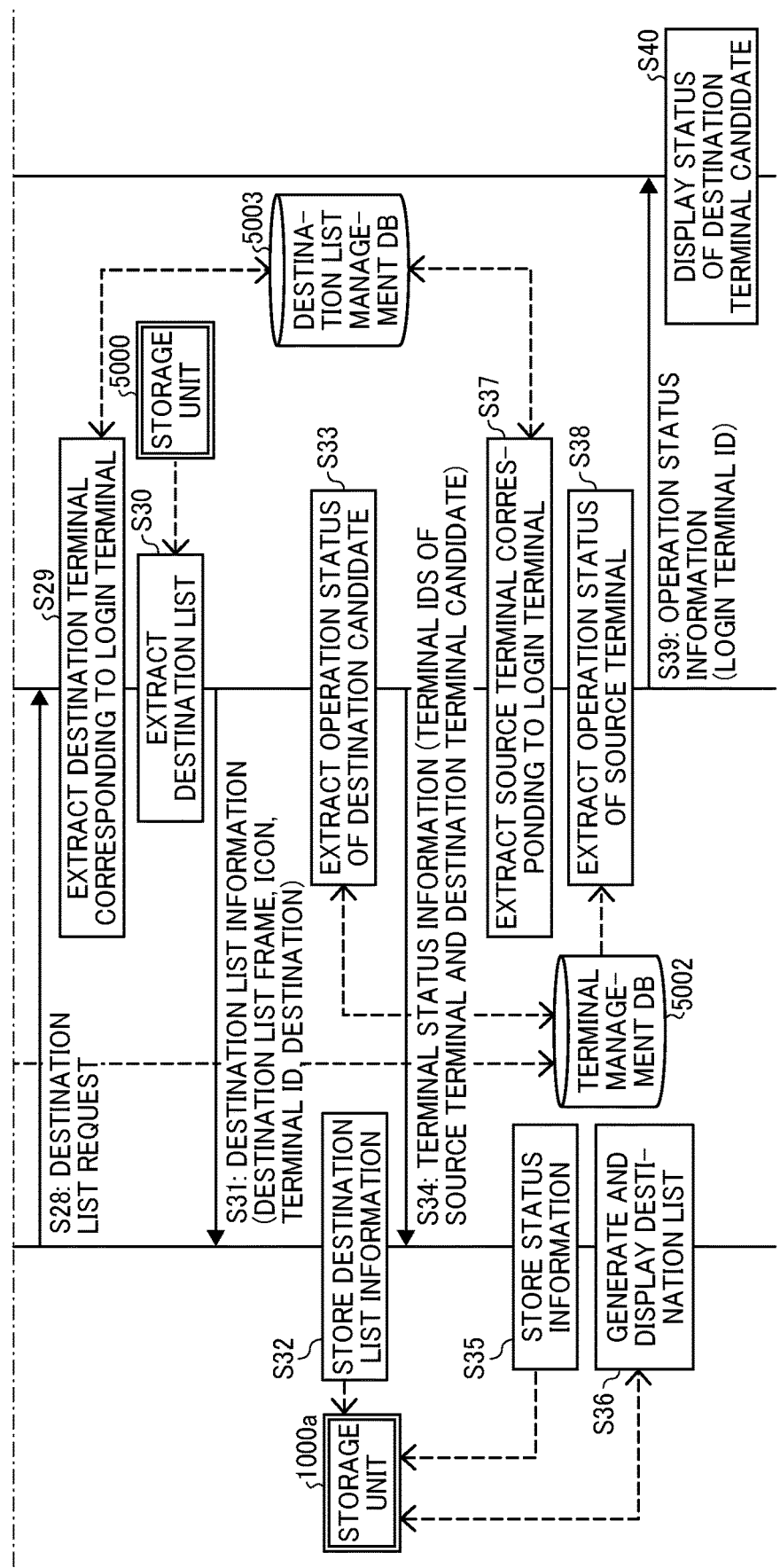
Figure 13:
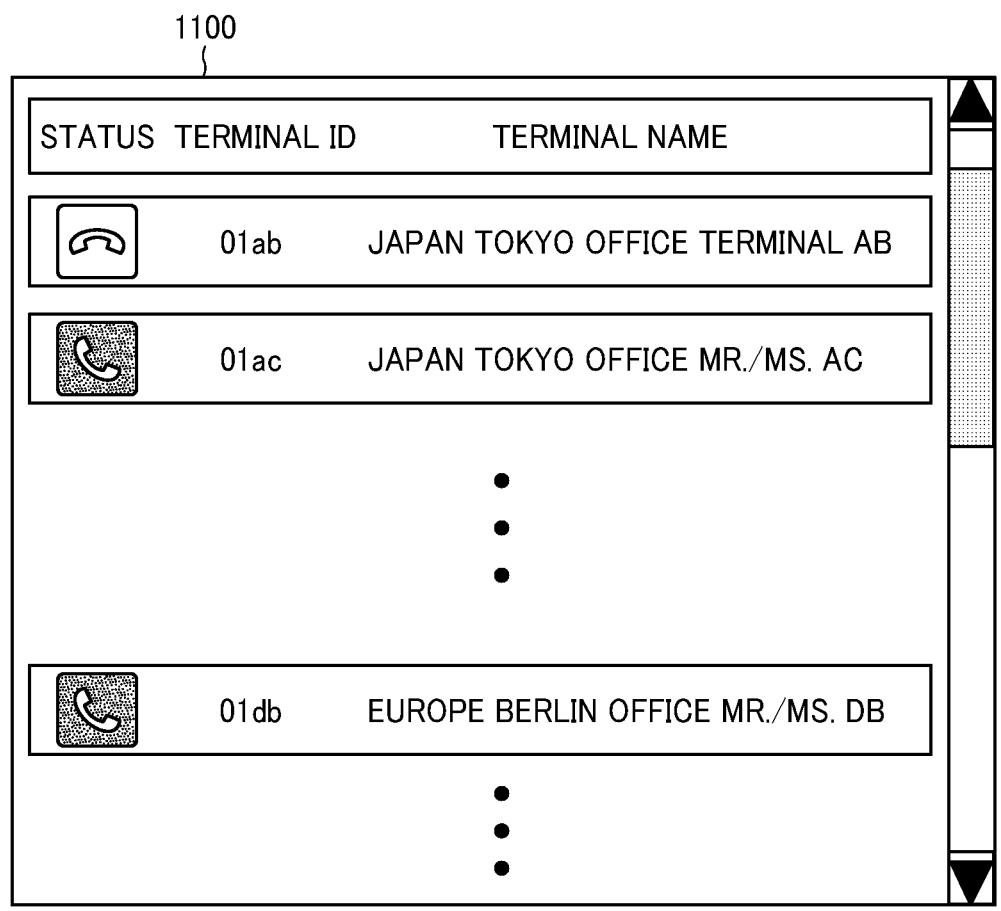
FIG. 13 is a diagram illustrating an example of destination list displayed on the electronic whiteboard.

A preparation process for remote communication executed by the electronic whiteboard 1a as a request terminal is described with reference to FIG. 12A, FIG. 12B, and FIG. 13. FIG. 12A and FIG. 12B are a sequence diagram illustrating a process for preparing to start remote communication between the electronic whiteboards. FIG. 13 is a diagram illustrating an example of destination list displayed on the electronic whiteboard 1a. The login process by the electronic whiteboard 1b is the same as the process of the electronic whiteboard 1a, and thus the description thereof is omitted.

In step S22, when the power switch 122 on the electronic whiteboard 1a is turned on, the acceptance unit 12a accepts a request to turn on the power of the electronic whiteboard 1a.

In step S23, the data exchange unit 11a transmits a login request indicating a request for login authentication to the communication management system 5 through the communication network 100. This login request includes the terminal ID and password of the electronic whiteboard 1a.

In step S24, the storing and reading processor 59 of the communication management system 5 uses the terminal ID and password included in the login request received through the data exchange unit 51 as a search key and searches the authentication management table illustrated in FIG. 7 and authenticates the electronic whiteboard 1a by determining whether the same terminal ID and the same password are stored. Here, the description is continued assuming that the same terminal ID and the same password are found in the authentication management table of FIG. 7 by the storing and reading processor 59.

Assuming that the same terminal ID and the same password are stored, and the login request is determined to be from a terminal with a legitimate usage right, in step S25, the storing and reading processor 59 changes the operation status in the terminal management table (illustrated in FIG. 8) of the terminal ID received in step S23 to "ONLINE (READY)" and stores the reception date and time when the login request is received in step S23 in the reception date and time in the terminal management table. Thereby, in the terminal management table, the terminal ID "01aa", the operation status "ONLINE (ready)", the reception date and time "2015.4.10.13:40", and the IP address "1.2.1.3" are stored in association with each other. Note that the IP address of the terminal may not be registered in advance but may be transmitted from the electronic whiteboard 1a in step S23.

In step S26, the storing and reading processor 59 adds a new record including the terminal ID of the electronic whiteboard 1a received in step S23 in the session management table as illustrated in FIG. 10. In step S27, the data exchange unit 51 of the communication management system 5 transmits the authentication result obtained in step S24 to the electronic whiteboard 1a that has requested the login through the communication network 100.

In step S28, the data exchange unit 11a transmits a destination list request to the communication management system 5 through the communication network 100, in response to the authentication result indicating that the terminal has a valid use authority received by the data exchange unit 11a of the login request terminal (electronic whiteboard 1a). Thereby, the data exchange unit 51 of the communication management system 5 receives the destination list request.

In step S29, the storing and reading processor 59 searches the destination list management table illustrated in FIG. 9 using the terminal ID "01aa" of the login request terminal (electronic whiteboard 1a) as a search key, acquires the terminal ID of the destination terminal candidate that can communicate with the login request terminal (electronic whiteboard 1a), and reads the terminal name corresponding to the terminal ID from the terminal management table illustrated in FIG. 8. As a result, the terminal ID and terminal name of the destination terminal candidate corresponding to the terminal ID "01aa" of the login request terminal (electronic whiteboard 1a) are extracted.

In step S30, the data exchange unit 51 of the communication management system 5 reads destination list frame data and icon data indicating the operation status from the storage unit 5000 through the storing and reading processor 59. In step S31, the data exchange unit 51 of the communication management system 5 transmits destination list information including the destination list frame, icon, terminal ID and terminal name read by the storing and reading processor 59 to the login request terminal (electronic whiteboard 1a). In step S32, the data exchange unit 11a of the login request terminal (electronic whiteboard 1a) receives the destination list information and the storing and reading processor 19a stores the destination list information in the storage unit 1000a.

As described above, in the present embodiment, the destination list information is not managed by each terminal, but the communication management system 5 centrally manages the destination list information of all terminals. According to the present embodiment, for example, when a new electronic whiteboard is added to the communication system, when a devices already included in the communication system is replaced with a new model, or when appearance of the destination list frame is changed, since the communication management system 5 centrally manages all destination candidates, there is no need to change the destination list information on each terminal.

In step S33, the storing and reading processor 59 of the communication management system 5 searches the terminal management table illustrated in FIG. 8 using the terminal ID of the read destination terminal candidate as a search key, and acquire the operation status of the destination terminal candidate by reading the corresponding operation status for each terminal ID.

In step S34, the data exchange unit 51 transmits terminal status information including the terminal ID as the search key used in step S33 and the operation status of each corresponding destination terminal through the communication network 100 to the login request terminal (electronic whiteboard 1a).

In step S35, the storing and reading processor 19a of the login request terminal (electronic whiteboard 1a) successively stores the operation status information received from the communication management system 5 in the storage unit 1000a. As a result, the login request terminal (electronic whiteboard 1a) acquires the operation status of the destination terminal candidate (electronic whiteboard 1b) that can communicate with the login request terminal (electronic whiteboard 1a).

In step S36, the display control unit 14a of the login request terminal (electronic whiteboard 1a) generates a destination list reflecting the operation status of the destination terminal candidate based on the destination list information stored in the storage unit 1000a and the operation status information and displays the destination list screen 1100 illustrated in FIG. 13 on the display 180 of the electronic whiteboard 1a. On the destination list screen 1100, the icon indicating the operation status, the terminal ID, and the terminal name are displayed for each destination terminal candidate. In FIG. 13, the icons indicating the operation status of each terminal are displayed as "OFFLINE" and "ONLINE (READY)" from the top.

In step S37, the storing and reading processor 59 of the communication management system 5 searches the destination list management table illustrated in FIG. 9 based on the terminal ID "01aa" of the login request terminal (electronic whiteboard 1a) and extracts the terminal ID of other terminals that have registered the terminal ID "01 aa" of the login request terminal (electronic whiteboard 1a) as the destination terminal candidate. In the destination list management table illustrated in FIG. 9, the terminal IDs of other terminals to be read are "01ab", "01ba". "01da", and the like.

In step S38, the storing and reading processor 59 of the communication management system 5 searches the terminal management table illustrated in FIG. 8 based on the terminal ID "01aa" of the login request terminal (electronic whiteboard 1a) and acquire the operation status of the login request terminal (electronic whiteboard 1a).

In step S39, the data exchange unit 51 transmits the terminal ID "01aa" of the login request terminal (electronic whiteboard 1a) and the terminal status information including the operation status "ONLINE" acquired in step S38 to the terminal whose operation status is "ONLINE" in the terminal management table illustrated in FIG. 8, among the terminals identified by the terminal IDs extracted in step S37. When the data exchange unit 51 transmits the status information of a terminal to the electronic whiteboard 1b, the IP address of the electronic whiteboard stored in the terminal management table illustrated in FIG. 8 is referred to based on each terminal ID. For each of the other destination terminals that can communicate with the login request terminal (electronic whiteboard 1a) as a destination terminal candidate, the terminal ID "01aa" and the operation status "ONLINE" of the login request terminal (electronic whiteboard 1a) are transmitted. In step S40, the operation status of the other destination terminal candidate is displayed on the destination terminal candidate (such as the electronic whiteboard 1b).

Figure 14:
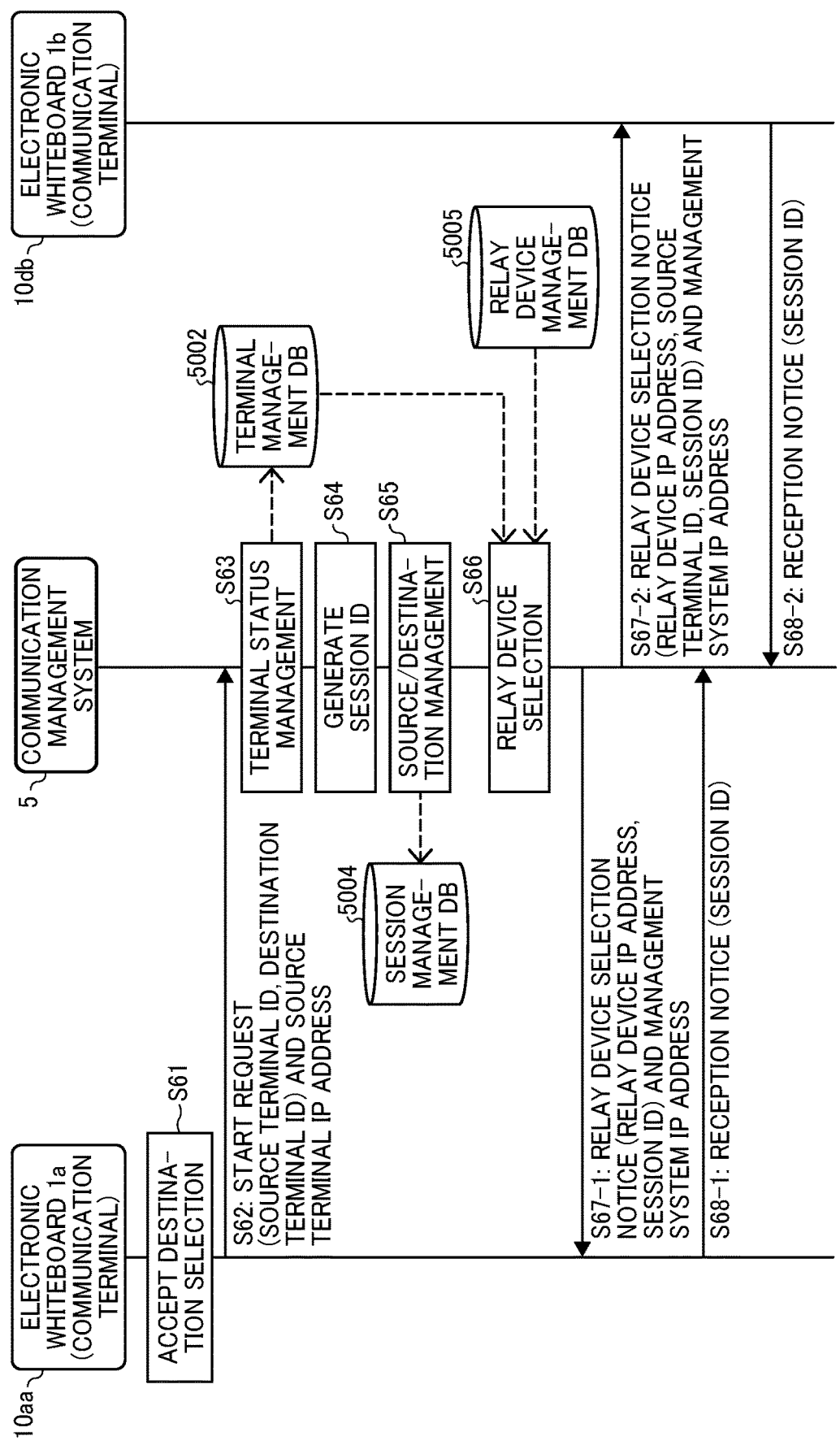
FIG. 14 is a sequence diagram illustrating a process for starting remote communication.

A process in which the electronic whiteboard 1a starts remote communication with the electronic whiteboard 1b is described with reference to FIG. 14. FIG. 14 is a sequence diagram illustrating the process for starting the remote communication.

In step S61, when the user of the source terminal (electronic whiteboard 1a) selects the electronic whiteboard 1b by selecting a destination terminal candidate (terminal ID "01ba") illustrated in FIG. 8, the acceptance unit 12a illustrated in FIG. 6A accepts a request to start a call with the selected destination terminal (electronic whiteboard 1b). In step 62, the data exchange unit 11a of the source terminal (electronic whiteboard 1a) transmits a start request to start a call to the communication management system 5. The start request includes the terminal ID "01aa" of the source terminal (electronic whiteboard 1a) and the terminal ID "01 ba" of the destination terminal (electronic whiteboard 1b). As a result, the data exchange unit 51 of the communication management system 5 receives the start request and the IP address of the source terminal (electronic whiteboard 1a) that is the transmission source.

In step S63, the storing and reading processor 59 changes the operation status of the terminal ID "01aa" and the terminal ID "01ba" to "busy" in the terminal management table illustrated in FIG. 8 based on the terminal ID "01aa" of the source terminal (electronic whiteboard 1a) and the terminal ID "01ba" of the destination terminal (electronic whiteboard 1b) included in the start request. The source terminal (electronic whiteboard 1a) and the destination terminal (electronic whiteboard 1b) have not started a video conference but are in a call status and when a third electronic whiteboard attempts to make a call with the source terminal (electronic whiteboard 1a) or the destination terminal (electronic whiteboard 1b), a notification sound or display indicating a busy status is output.

A process for executing a session for selecting the relay device 3 to be used is described. In step S64, the generation unit 53 of the communication management system 5 generates session ID used for execution of the session for selecting the relay device 3. Here, a case where the session ID "se1" is generated is described.

In step S65, the storing and reading processor 59 stores the session ID "se01" generated in step S64, the terminal ID "01aa" of the source terminal (electronic whiteboard 1a), and the terminal ID "01ba" of the destination terminal (electronic whiteboard 1b) in association with each other in the session management table illustrated in FIG. 10.

In step S66, the selector 54 of the communication management system 5 illustrated in FIG. 6A selects the relay device 3 for relaying a call between the two sites of the source terminal (electronic whiteboard 1a) and the destination terminal (electronic whiteboard 1b) based on the relay device management table illustrated in FIG. 11 and the terminal management table illustrated in FIG. 8. Specifically, among the relay device IDs of the relay devices each having the operation status "ONLINE" in the relay device management table illustrated in FIG. 11, the relay device ID of the relay device 3 having an IP address indicating a location close to that of the IP address of the source terminal (electronic whiteboard 1a) in the terminal management table illustrated in FIG. 8 is selected. Here, a case where the relay device 3 identified by the relay device ID "111a" is selected is described.

In step S67-1, when the relay device selection process in step S66 is completed, the data exchange unit 51 of the communication management system 5 transmits the relay device selection notice to the source terminal (electronic whiteboard 1a). The relay device selection notice includes the IP address of the relay device 3 selected in step S66 and the session ID "se1" generated in step S64. Thereby, the source terminal (electronic whiteboard 1a) can acquire the IP address of the communication management system 5 which is the transmission source of the relay device selection notice.

In step S67-2, the data exchange unit 51 of the communication management system 5 transmits the relay device selection notice to the destination terminal (electronic whiteboard 1b). The relay device selection notice includes the IP address of the relay device 3 selected in step S66, the terminal ID "01aa" of the source terminal (electronic whiteboard 1a), and the session ID "se1" generated in step S64. Thereby, the destination terminal (electronic whiteboard 1b) acquires the IP address of the communication management system 5 that is the transmission source of the relay device selection notice in the execution of the session with the session ID "se1".

In step S68-1, the data exchange unit 11 of the source terminal (electronic whiteboard 1a) transmits reception notice indicating that the relay device selection notice is received in step S67-1 to the communication management system 5. The reception notice includes the session ID exchanged in the process of step S67-1. As a result, the communication management system 5 acknowledges that the transmission of the relay device selection notice executed with the specific session ID "se1" has been completed.

In step 68-2, the destination terminal (electronic whiteboard 1b) transmits reception notice indicating that the relay device selection notice has been received through the processing of step S67-2 to the communication management system 5.

The communication management system 5 acknowledges that the transmission of the relay device selection notice executed with the specific session ID "se1" has been completed.

As described above, the electronic whiteboards 1a and 1b perform the video conference by exchanging video data and audio data through the relay device 3 selected in step S66.

Figure 15:
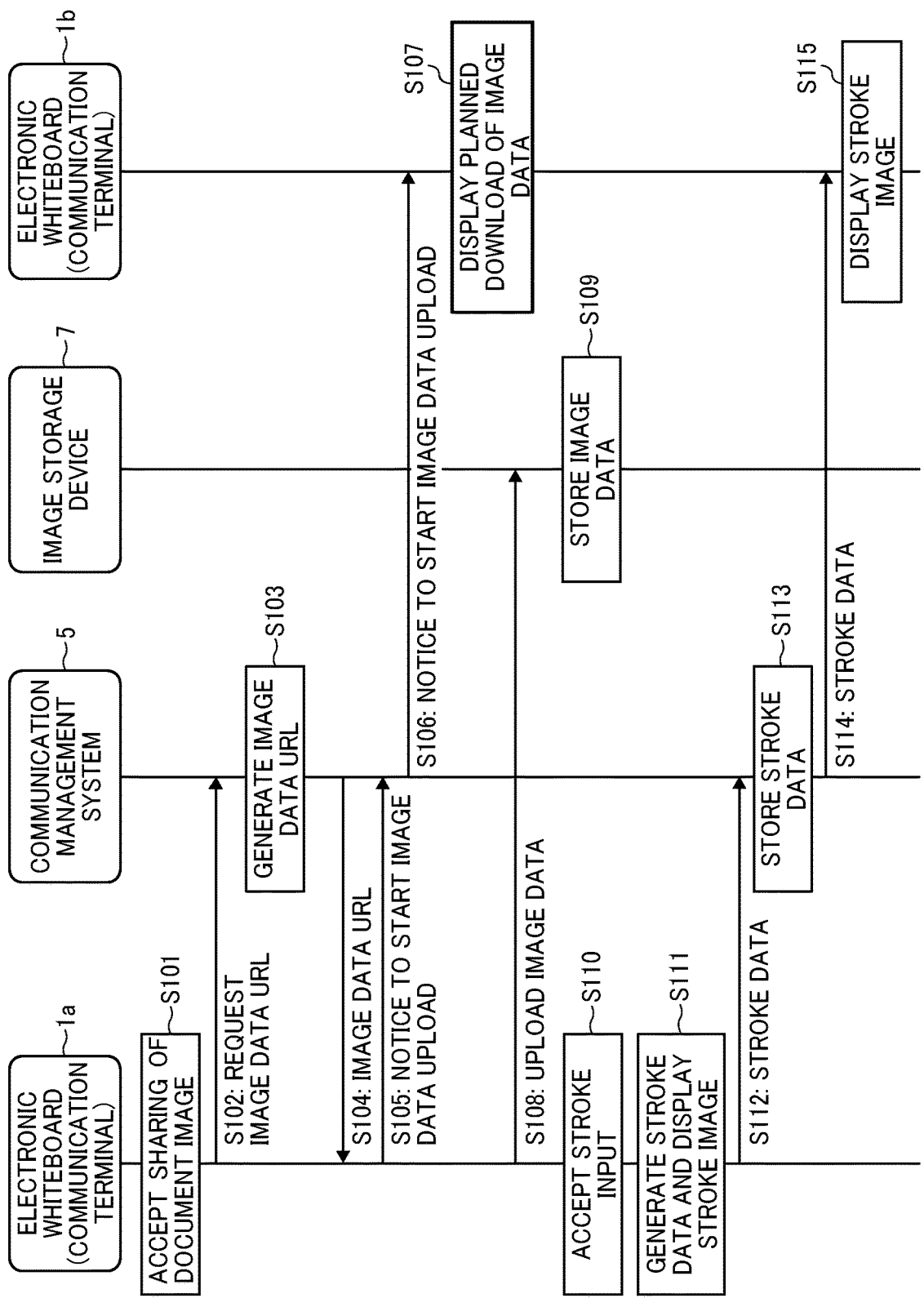
FIG. 15 is a sequence diagram illustrating a process for sharing image data of a document image and stroke data of a stroke image.
Figure 16:
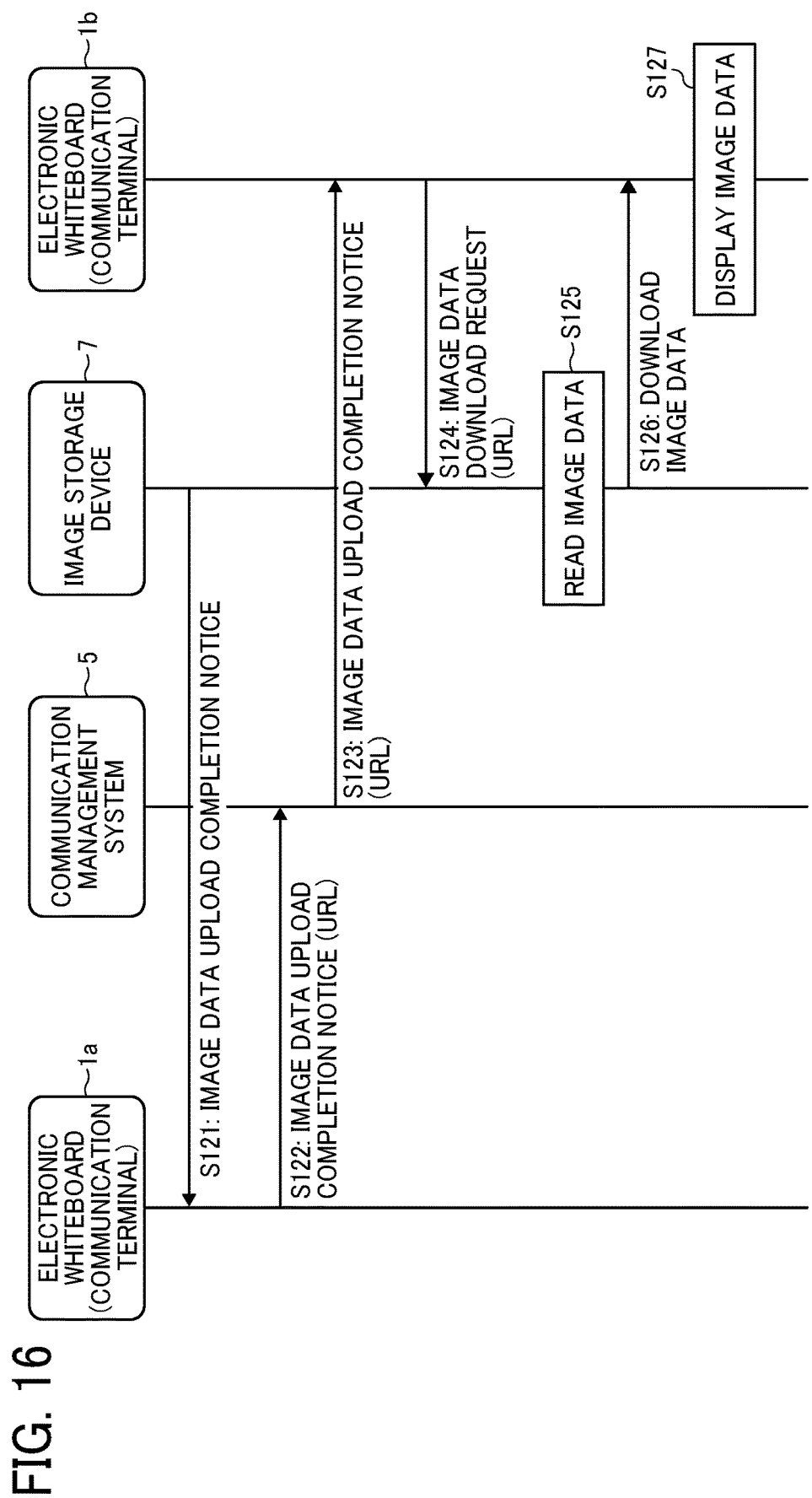
FIG. 16 is a sequence diagram illustrating a process for sharing image data of the document image and stroke data of the stroke image.

Hereinafter, a process of communicating the document image displayed on the electronic whiteboard 1 and the stroke image input to the electronic whiteboard 1 is described with reference to FIGS. 15 to 17D. FIG. 15 and FIG. 16 are a sequence diagram illustrating the process for sharing image data of the document image and stroke data of the stroke image. In the present embodiment, the electronic whiteboard 1a and the electronic whiteboard 1b share data, such as the image data of the document image and the stroke data of the stroke image. Here, a case where the document image and the stroke image displayed on the electronic whiteboard 1a are also displayed on the electronic whiteboard 1b is described. FIG. 17A is a screen example of the electronic whiteboard 1a, FIG. 17B is a screen example of the electronic whiteboard 1b, FIG. 17C is another screen example of the electronic whiteboard 1a, and FIG. 17D is another screen example of the electronic whiteboard 1b.

On the electronic whiteboard 1a at the site A, the screen illustrated in FIG. 17A is displayed on the display 180 by the display control unit 14a. A document image dl, a video image v2 of the site B, and a Share button b1 to be pressed when sharing the document image dl are displayed on the electronic whiteboard 1a at the site A. In step S101, the acceptance unit 12a accepts an instruction to share data, such as the document image, in response to a pressing of the Share button b1 by the user A1 of the electronic whiteboard 1a. In step S102, the data exchange unit 11a transmits a request for a Uniform Resource Locator (URL) indicating the storage location of the image data of the document image dl to the communication management system 5. Thereby, the data exchange unit 51 of the communication management system 5 receives the request. The URL is an example of storage location information, and another example of the storage location information includes a Uniform Resource Identifier (URI).

In step S103, the generation unit 53 of the communication management system 5 generates a URL indicating the storage location of the image data of the document image dl. In step S104, the data exchange unit 51 transmits the URL of the image data generated by the generation unit 53 to the electronic whiteboard 1a. Thereby, the data exchange unit 11a of the electronic whiteboard 1a receives the URL of the image data of the document image dl.

In step S105, the data exchange unit 11a of the electronic whiteboard 1a transmits an upload start notice of the image data of the document image dl to the communication management system 5. Thereby, the data exchange unit 51 of the communication management system 5 receives the upload start notice.

In step S106, the data exchange unit 51 transfers the upload start notice to the electronic whiteboard 1b participating in the remote conference. Thereby, the data exchange unit 11b of the electronic whiteboard 1b receives the upload start notice. In step S107, the display control unit 14b of the electronic whiteboard 1b displays a screen as illustrated in FIG. 17B on the display 180 of the electronic whiteboard 1b. In response to receiving the upload start notice in step S106, the display control unit 14b of the electronic whiteboard 1b displays an hourglass icon c2 that visually indicates the progress in downloading the image data of the document image dl, in addition to the video image v1 of the site A and the Share button b2.

In this example, elapsed time, which reflects the progress, can be indicated by a still-image hourglass or an animated hourglass with the change in amount of sand in the hourglass. The hourglass icon c2 is an example of progress information indicating that downloading of the image data is taking place. Other examples of progress information may be any icon other than hourglass icon, for example, a clock icon, character (and/or symbol) instead of icon, or combination of icon and character (and/or symbol). The progress information may be output as a notification by sound. In this case, sound is output from the speaker 150 under control of the video/audio processing unit 13b.

The electronic whiteboard 1a may perform the process of step S102 after the process of step S105. The communication management system 5 may transmit the URL of the image data in step S104 after receiving the image data upload start notice in step S105.

In step S108, the data exchange unit 11a of the electronic whiteboard 1a uploads the image data of the document image to a storage location of the image storage device 7 indicated by the URL received in step S104. Thereby, the data exchange unit 71 of the image storage device 7 receives the image data of the document image dl. In step S109, the storing and reading processor 79 of the image storage device 7 stores the image data in the storage location indicated by the URL in the storage unit 7000.

In step S110 at the site A, the user A1 moves the electronic pen 190 or the hand H in contact with the display 180 of the electronic whiteboard 1a, and the acceptance unit 12a accepts an input of a stroke movement (trajectory). In step S111, the image processing unit 17a creates stroke data (for example, coordinate data (x, y)) for displaying a stroke image on the two-dimensional display 180 based on the stroke, and the display control unit 14a displays the stroke image on the display 180 of the electronic whiteboard 1a. Thereby, the stroke image st1 is displayed as illustrated in FIG. 17C.

In step S112, the data exchange unit 11a transmits the stroke data for reproducing the stroke image generated in step S111 to the communication management system 5. Thereby, the data exchange unit 51 of the communication management system 5 receives the stroke data of the stroke image. In step S113, the storing and reading processor 59 of the communication management system 5 stores the stroke data such as in the storage unit 5000.

In step S114, the data exchange unit 51 transfers the stroke data to the destination electronic whiteboard 1b. Thereby, the data exchange unit 1I b of the electronic whiteboard 1b receives the stroke data. In step S115, the image processing unit 17b of the electronic whiteboard 1b generates a stroke image based on the stroke data, and the display control unit 14b displays the stroke image on the display 180 of the electronic whiteboard 1b. Thereby, the same stroke image st1 as that of the source electronic whiteboard 1a is displayed, as illustrated in FIG. 17D.

In step S121 of FIG. 16, the data exchange unit 71 of the image storage device 7 transmits an upload completion notice indicating that the upload of the image data of the document image dl is completed to the electronic whiteboard 1a Thereby, the data exchange unit 11a of the electronic whiteboard 1a receives the upload completion notice.

In step S122, the data exchange unit 11a of the electronic whiteboard 1a transmits an upload completion notice indicating that the upload of the image data of the document image dl is completed to the communication management system 5.

This upload completion notice includes the URL of the image data received in step S104. Thereby, the data exchange unit 51 of the communication management system 5 receives the upload completion notice. In step S123, the data exchange unit 51 transfers the upload completion notice including the URL of the image data of the document image dl to the destination electronic whiteboard 1b. Thereby, the data exchange unit 11b of the electronic whiteboard 1b receives the upload completion notice.

In step S124, the data exchange unit 11b of the electronic whiteboard 1b transmits a request to download the image data of the document image d by accessing the URL indicating a storage location at the image storage device 7 received in step S123. Thereby, the data exchange unit 71 of the image storage device 7 receives the image data download request.

In step S125, the storing and reading processor 79 of the image storage device 7 reads the image data of the document image dl based on the requested URL from the storage unit 7000. In step S126, the data exchange unit 71 transmits the requested image data of the document image dl to the request source electronic whiteboard 1b. Thereby, the data exchange unit 11b of the electronic whiteboard 1b downloads (receives) the image data. The display control unit 14b of the electronic whiteboard 1b displays the same document image as the document image dl illustrated in FIG. 17C on the screen illustrated in FIG. 17D and stops displaying the hourglass icon c2 displayed until then.

As described above, even if the electronic whiteboard 1a transmits the image data of the document image before transmitting the stroke data of the stroke image, each data being data to be shared with a counterpart electronic whiteboard 1b, the stroke data is downloaded for display at the destination electronic whiteboard 1b first since the size of the stroke data is much smaller than the size of the image data. Further, the stroke data specifies coordinates, such that display processing of the stroked data usually takes less time than that of processing image data, which is a graphical image. In such case, if the hourglass icon c2 is not displayed, the users B1 and B2 at the electronic whiteboard b2 can only see the stroke image st1. This may confuse the users B1 and B2, as the users B1 and B2 do not know if there is another image (this case, the document image dl to be pointed out by the arrow indicated by the stroke image st1) to be displayed.

In view of this, in the present embodiment, the communication management system 5 receives the upload start notice from the electronic whiteboard 1a that uploads image data to be displayed at the counterpart electronic whiteboard 1b, and transfers (transmits) the upload start notice to the electronic whiteboard 1b (refer to step S106). On the electronic whiteboard 1b, the hourglass icon c2 that visually indicates that the image data of the document image is being downloaded is displayed as illustrated in FIG. 17B (refer to step S107). With this hourglass icon c2 being displayed in response to reception of the upload start notice, the users B1 and B2 of the electronic whiteboard 1b at the site B become aware of the presence of document image being downloaded even when the stroke image is displayed before the document image is displayed.

In the above-described embodiment, an office device that is an electronic whiteboard has been described as an example of a communication terminal, however, the communication terminal in the present disclosure is not limited to the office devices. Other examples of communication terminals include PCs, smartphones, smart watches, car navigation terminals, and the like. Further, the communication terminal includes medical devices. In the case of a medical device, the document image is a patient image.

Further, in the above embodiment, the case where the video conference is performed by the communication system has been described. However, the present disclosure is not limited to this case and may be used for meetings, general conversations between family members, friends, remote diagnosis, or presentation of information in one direction.

The above-described embodiments are illustrative and do not limit the present disclosure. Thus, numerous additional modifications and variations are possible in light of the above teachings. For example, elements and/or features of different illustrative embodiments may be combined with each other and/or substituted for each other within the scope of the present disclosure.

Any one of the above-described operations may be performed in various other ways, for example, in an order different from the one described above.

For example, in the above-described embodiment, S101 is performed before S110. In another example, S110 may be performed at substantially the same time with S101, or before S101. Even when S101 is performed after S110, a time it takes for image data of the document image dl may take longer than that of stroke data. Even in such case, as long as the image data of the document image is being downloaded, the counterpart electronic whiteboard 1b displays information indicating that downloading of image data is taking place.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA) and conventional circuit components arranged to perform the recited functions.

What is claimed is:

1. A communication management system for managing sharing of data between a plurality of communication terminals, the communication management system comprising:
  circuitry configured to:
    transmit storage location information indicating a storage location of image data, the storage location information to be received by a first communication terminal of the plurality of communication terminals;
    receive a notice indicating a start of uploading of the image data to the storage location indicated by the storage location information, the notice transmitted by the first communication terminal;
    transmit the notice indicating the start of uploading of the image data, the notice to be received by a second communication terminal of the plurality of communication terminals;
    receive stroke data for reproducing a stroke image, the stroke data transmitted by the first communication terminal; and
    transmit the stroke data, the stroke data to be received by the second communication terminal.

2. The communication management system of claim 1, wherein the circuitry is further configured to:
  receive a request for storage location information, the request transmitted by the first communication terminal in response to an instruction to share data; and
  generate the storage location information in response to receiving the request.

3. A communication system comprising:
  the communication management system of claim 1;
  a first communication terminal; and
  a second communication terminal.

4. The communication system of claim 3, wherein the second communication terminal comprises another circuitry configured to:
  display on a display, information indicating downloading of the image data is being progressed in response to receiving the notice indicating the start of uploading of the image data.

5. The communication system of claim 4, wherein the information indicating downloading of the image data includes an icon visually indicating the progress in downloading the image data.

6. The communication system of claim 5, wherein the icon represents an hourglass.

7. A communication system comprising:
  the communication management system of claim 1;
  a first communication terminal;
  a second communication terminal; and
  an image storage device comprising a memory that stores the image data at the storage location indicated by the storage location.

8. The communication system of claim 7 wherein the circuitry of the first communication terminal is configured to:
  transmit the image data to the image storage device to cause the image data to be stored at the storage location indicated by the storage location information; and
  transmit the stroke data to the second communication terminal via the communication management system.

9. A communication control method for managing sharing of data between a plurality of communication terminals, the communication control method comprising:
  transmitting storage location information indicating a storage location of image data, the storage location information to be received by a first communication terminal of the plurality of communication terminals;
  receiving a notice indicating a start of uploading of the image data to the storage location indicated by the storage location information, the notice transmitted by the first communication terminal;
  transmitting the notice indicating the start of uploading of the image data, the notice to be received by a second communication terminal of the plurality of communication terminals;
  receiving stroke data for reproducing a stroke image, the stroke data transmitted by the first communication terminal; and
  transmitting the stroke data, the stroke data to be received by the second communication terminal.

10. A non-transitory recording medium which, when executed by one or more processors, cause the processors to perform a communication control method for managing sharing of data between a plurality of communication terminals, the communication control method comprising:
  transmitting storage location information indicating a storage location of image data, the storage location information to be received by a first communication terminal of the plurality of communication terminals;
  receiving a notice indicating a start of uploading of the image data to the storage location indicated by the storage location information, the notice transmitted by the first communication terminal;
  transmitting the notice indicating the start of uploading of the image data, the notice to be received by a second communication terminal of the plurality of communication terminals;
  receiving stroke data for reproducing a stroke image, the stroke data transmitted by the first communication terminal; and
  transmitting the stroke data, the stroke data to be received by the second communication terminal.

* * * * *